United States Patent
Hu

(10) Patent No.: US 10,823,966 B2
(45) Date of Patent: *Nov. 3, 2020

(54) LIGHT WEIGHT DISPLAY GLASSES

(71) Applicant: Darwin Hu, San Jose, CA (US)

(72) Inventor: Darwin Hu, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/996,499

(22) Filed: Jun. 3, 2018

(65) Prior Publication Data

US 2018/0356637 A1    Dec. 13, 2018

Related U.S. Application Data

(63) Continuation-in-part of application No. 15/944,691, filed on Apr. 3, 2018, now abandoned, which is a continuation of application No. 15/372,957, filed on Dec. 8, 2016, now Pat. No. 9,946,075.

(51) Int. Cl.
| | |
|---|---|
| *G02B 27/01* | (2006.01) |
| *F21V 8/00* | (2006.01) |
| *G02B 27/00* | (2006.01) |
| *G02B 6/42* | (2006.01) |
| *G02B 6/44* | (2006.01) |
| *G06F 1/16* | (2006.01) |
| *G06F 3/01* | (2006.01) |

(52) U.S. Cl.
CPC ......... *G02B 27/0172* (2013.01); *G02B 6/003* (2013.01); *G02B 6/0006* (2013.01); *G02B 6/0008* (2013.01); *G02B 6/0035* (2013.01); *G02B 6/4204* (2013.01); *G02B 6/443* (2013.01); *G02B 6/4471* (2013.01); *G02B 27/0093* (2013.01); *G06F 1/163* (2013.01); *G06F 3/011* (2013.01); *G06F 3/013* (2013.01); *G02B 2027/011* (2013.01); *G02B 2027/014* (2013.01); *G02B 2027/0138* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 2007/0211777 A1* | 9/2007 | Simavoryan | G02B 19/0057 372/50.12 |
| 2011/0057862 A1* | 3/2011 | Chen | G02B 27/017 345/3.1 |
| 2012/0008900 A1* | 1/2012 | Schneider | G02B 6/3608 385/50 |
| 2014/0328563 A1* | 11/2014 | DeMeritt | G02B 6/4436 385/100 |
| 2014/0333734 A1* | 11/2014 | Yang | G02B 27/017 348/53 |

(Continued)

*Primary Examiner* — Krishna P Neupane
(74) *Attorney, Agent, or Firm* — Joe Zheng

(57) ABSTRACT

Architecture and designs of wearable display devices are described. According to one aspect of the present invention, at least one optical conduit is embedded in or integrated with a temple of the wearable display device. The optical conduit is used to transport an optical image from one end to another end, where the optical image is generated in an image source (e.g., microdisplay) in accordance with image data. The microdisplay is powered and receives the image data and control signals via an active optical cable.

19 Claims, 28 Drawing Sheets

(56) References Cited

U.S. PATENT DOCUMENTS

| | | | |
|---|---|---|---|
| 2015/0234477 A1* | 8/2015 | Abovitz | G06F 16/7837 |
| | | | 382/103 |
| 2016/0025984 A1* | 1/2016 | Hino | G02B 26/0816 |
| | | | 345/8 |
| 2016/0033771 A1* | 2/2016 | Tremblay | G02B 26/10 |
| | | | 345/8 |
| 2017/0090851 A1* | 3/2017 | Takano | G06F 3/1454 |

* cited by examiner

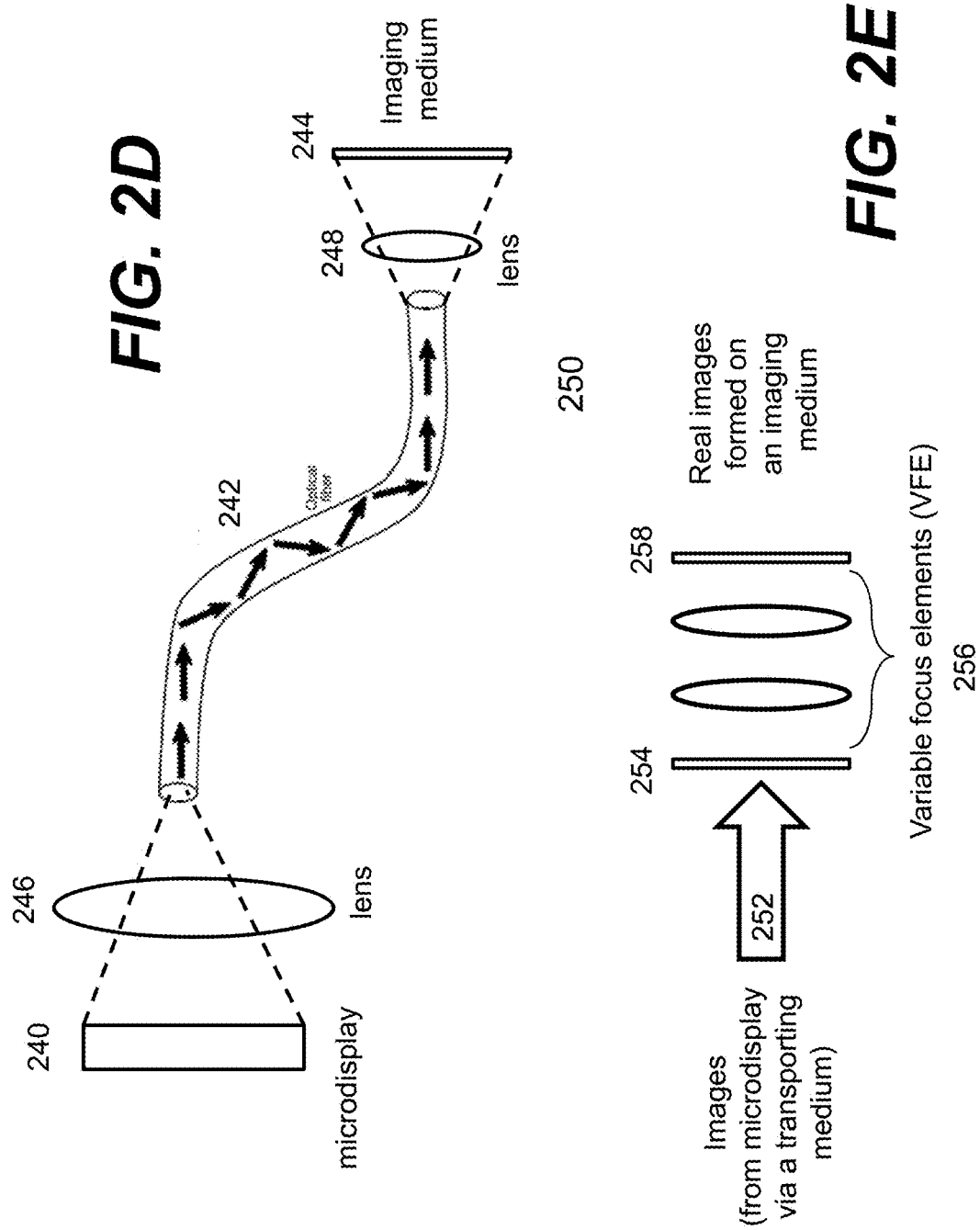

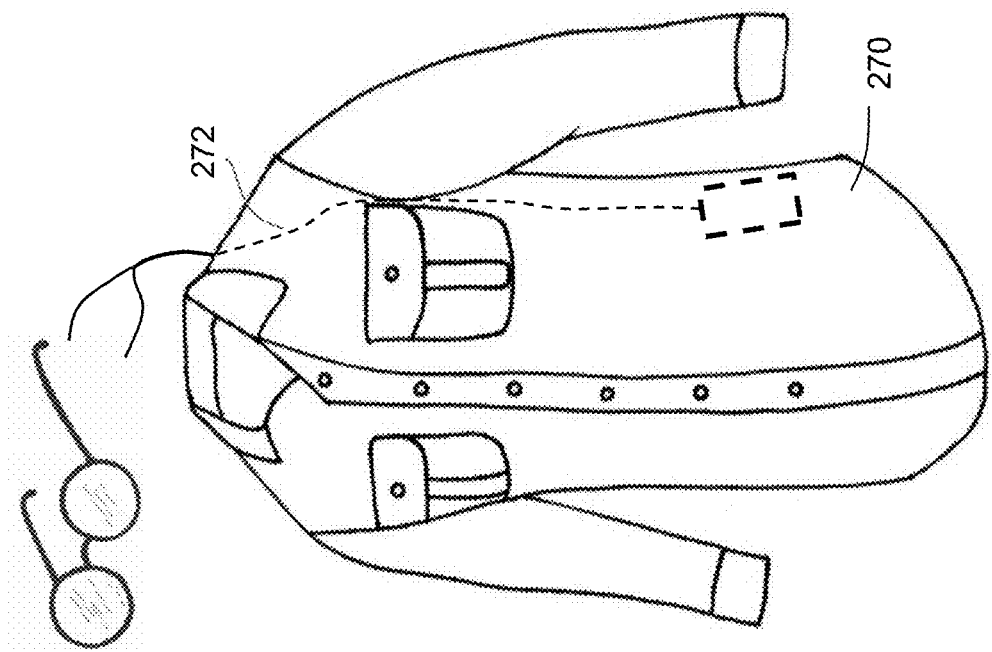

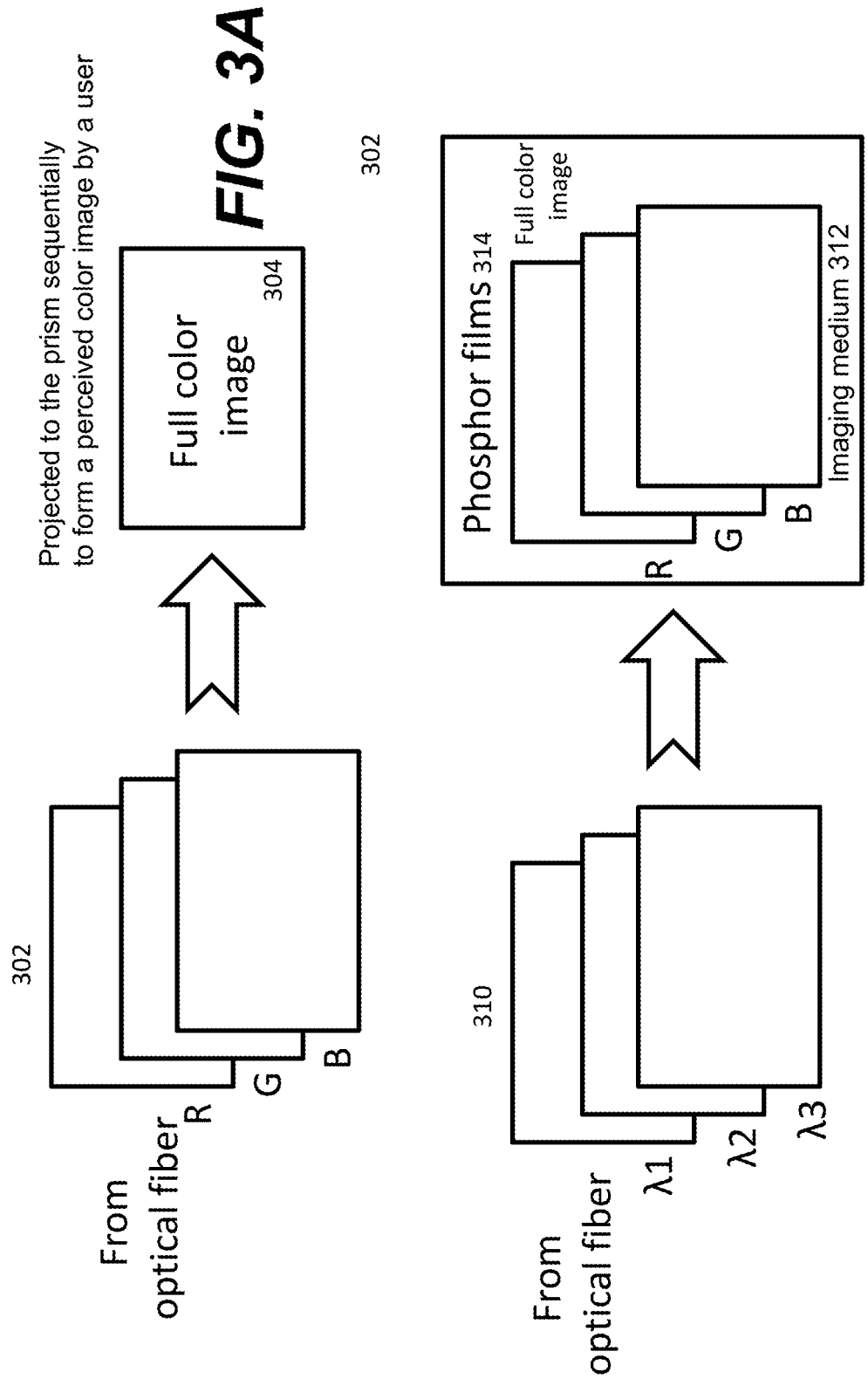

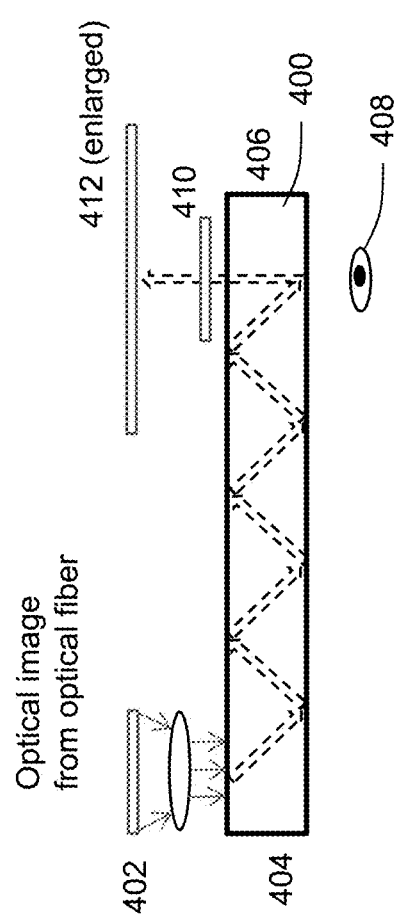

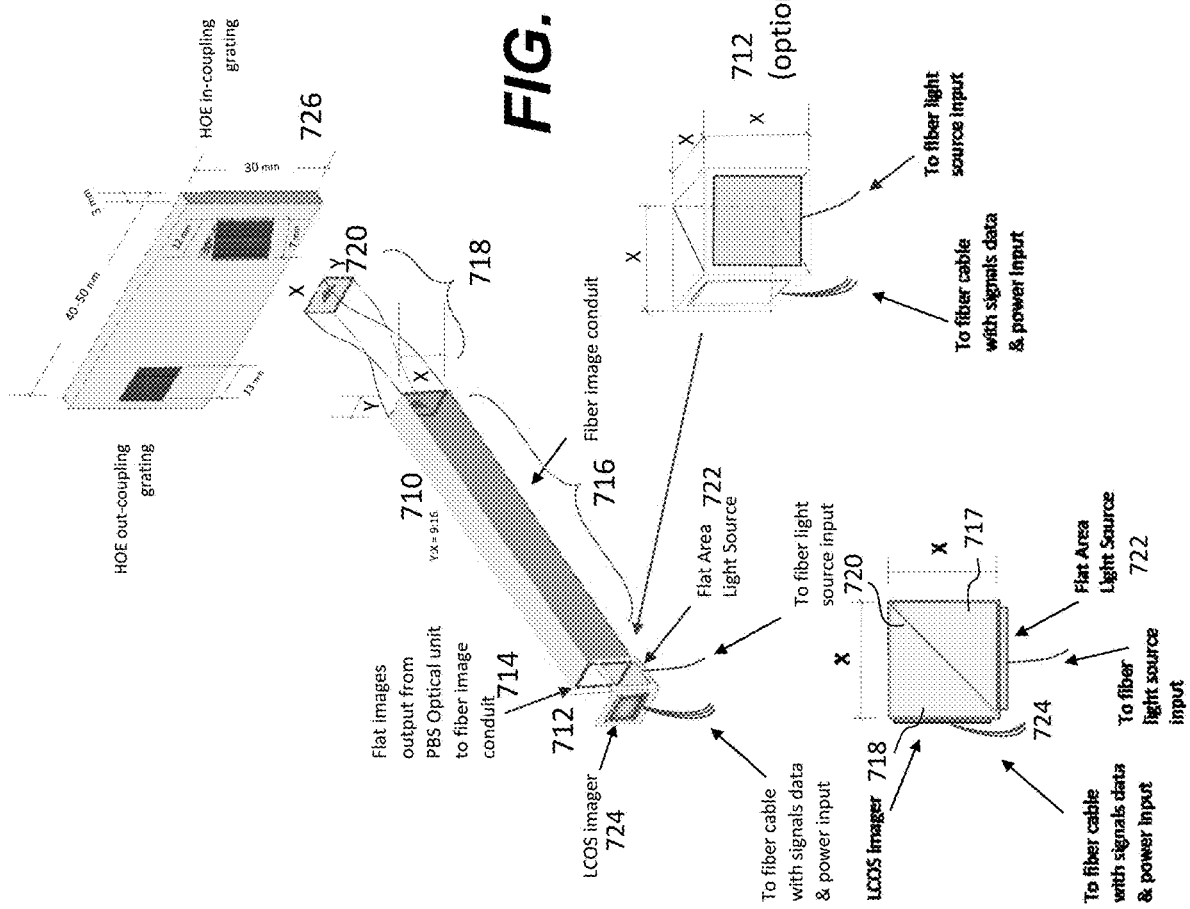

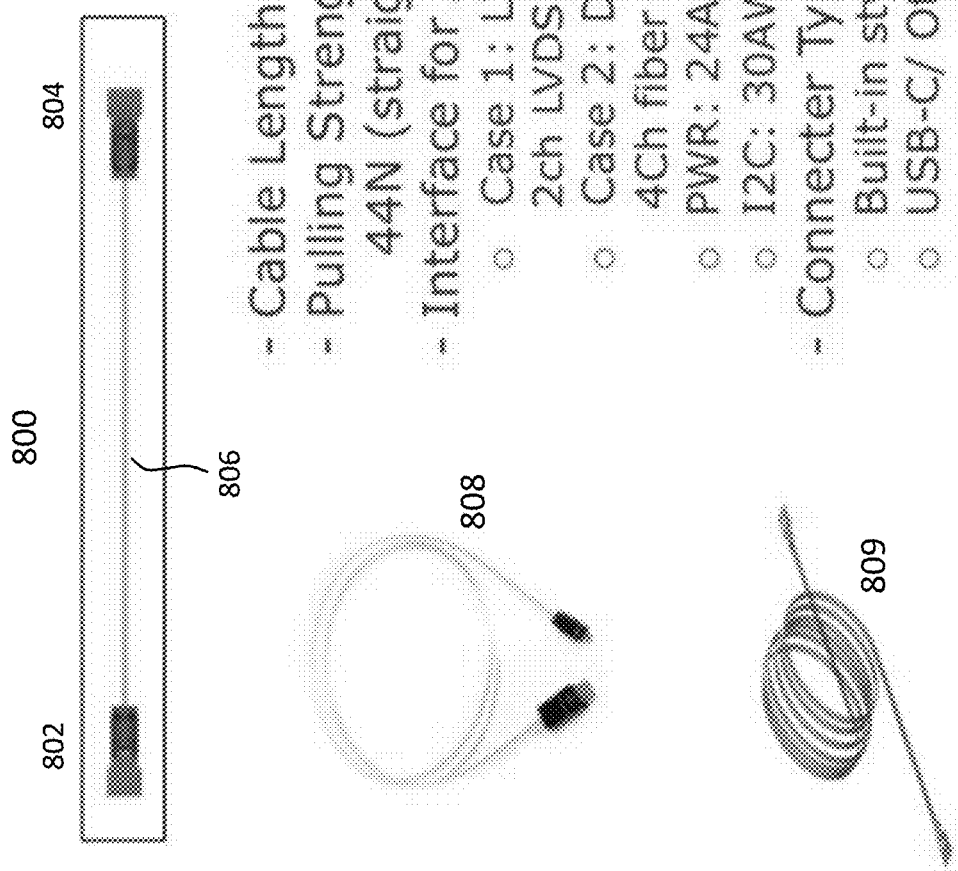

- Customize AOC Cable
  - 10 channel Fibers without SERDES -> not recommending over cost/manufacturing hardness over align dies
  - 4 channel fibers with SERDES (Case 1-1): 24AWG PWR, Aux, I2C
- Cable Thickness: 4 to 5mm

LIGHT WEIGHT DISPLAY GLASSES

BACKGROUND OF THE INVENTION

Field of the Invention

The present invention generally relates to the area of display devices and more particularly relates to architecture and designs of display devices, where a display device is made in form of a pair of glasses, and may be used in various applications including virtual reality and augmented reality.

Description of the Related Art

Virtual Reality or VR is generally defined as a realistic and immersive simulation of a three-dimensional environment created using interactive software and hardware, and experienced or controlled by movement of the body. A person using virtual reality equipment is typically able to look around the artificially generated three-dimensional environment, moves around in it and interacts with features or items that are depicted on a screen or in goggles. Virtual realities artificially create sensory experiences, which can include sight, touch, hearing, and, less commonly, smell. Augmented reality (AR) is a technology that layers computer-generated enhancements atop an existing reality in order to make it more meaningful through the ability to interact with it. AR is developed into apps and used on mobile devices to blend digital components into the real world in such a way that they enhance one another, but can also be told apart easily. AR technology is quickly coming into the mainstream. It is used to display score overlays on telecasted sports games and pop out 3D emails, photos or text messages on mobile devices. Leaders of the tech industry are also using AR to do amazing and revolutionary things with holograms and motion activated commands.

The delivery methods of Virtual Reality and Augmented Reality are different when viewed separately. Most 2016-era virtual realities are displayed either on a computer monitor, a projector screen, or with a virtual reality headset (also called head-mounted display or HMD). HMDs typically take the form of head-mounted goggles with a screen in front of the eyes. Virtual Reality actually brings the user into the digital world by cutting off outside stimuli. In this way user is solely focusing on the digital content being displayed in the HMDs. Augmented reality is being used more and more in mobile devices such as laptops, smart phones, and tablets to change how the real world and digital images, graphics intersect and interact.

In reality, it is not always VR vs. AR as they do not always operate independently of one another, and in fact are often blended together to generate an even more immersing experience. For example, haptic feedback, which is the vibration and sensation added to interaction with graphics, is considered an augmentation. However, it is commonly used within a virtual reality setting in order to make the experience more lifelike though touch.

Virtual reality and augmented reality are great examples of experiences and interactions fueled by the desire to become immersed in a simulated land for entertainment and play, or to add a new dimension of interaction between digital devices and the real world. Alone or blended together, they are undoubtedly opening up worlds, both real and virtual alike.

FIG. 1A shows an exemplary goggle now commonly seen in the market for the application of delivering or displaying VR or AR. No matter how a goggle is designed, it appears bulky and heavy, and causes inconvenience when worn on a user. Further most of the goggles cannot be seen through. In other words, when a user wears a goggle, he or she would not be able to see or do anything else. Thus, there is a need for an apparatus that can display the VR and AR but also allows a user to perform other tasks if needed.

Various wearable devices for VR/AR and holographic applications are being developed. FIG. 1B shows a sketch of HoloLens from Microsoft. It weights 579 g (1.2 lbs). With the weight, a wearer won't feel comfortable when wearing it for a period. Indeed, what is available in the market is generally heavy and bulky in comparison to normal glasses. Thus there is still another need for a wearable AR/VR viewing or display device that looks similar to a pair of regular glasses but is also amenable to smaller footprint, enhanced impact performance, lower cost packaging, and easier manufacturing process.

Many glasses-like display devices employ a common design of positioning image forming components (such as LCOS) near the front or lens frames, hoping to reduce transmission loss of images and use fewer components. However, such a design often makes a glasses-like display device unbalanced, the front part is much heavier than the rear part of the glasses-like display device, adding some pressure on a nose. There is thus still another need to distribute the weight of such a display device when worn on a user.

Regardless how a wearable display device is designed, there are many components, wires and even batteries that must be used to make the display device function and operable. While there have been great efforts to move as many parts as possible to an attachable device or enclosure to drive the display device from a user's waist or pocket, the essential parts, such as copper wires, must be used to transmit various control signals and image data. The wires, often in form of a cable, do have a weight, which adds a pressure on a wearer when wearing such a display device. There is yet another need for a transmission medium that can be as light as possible without sacrificing the needed functions.

There are many other needs that are not to be listed individually but can be readily appreciated by those skilled in the art that these needs are clearly met by one or more embodiments of the present invention detailed herein.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

The present invention is generally related to architecture and designs of wearable devices that may be for virtual reality and augmented reality applications. According to one aspect of the present invention, a display device is made in form of a pair of glasses and includes a minimum number of parts to reduce the complexity and weight thereof. A separate case or enclosure is provided as portable to be affixed or attached to a user (e.g., a pocket or waist belt). The enclosure includes all necessary parts and circuits to generate content for virtual reality and augmented reality applications, resulting in a minimum number of parts needed on the glasses, hence smaller footprint, enhanced impact performance, lower cost packaging, and easier manufacturing process of the glasses. The content is optically picked up by an optical cable and transported by optical fibers in the optical cable to the glasses, where the content is projected respectively to the lenses specially made for displaying the content before the eyes of the wearer.

According to another aspect of the present invention, the glasses (i.e., the lenses therein) and the enclosure are coupled by an optical cable including at least one optical fiber, where the fiber is responsible for transporting the content or an optical image from one end of the optical fiber to another end thereof by total internal reflections within the fiber. The optical image is picked up by a focal lens from a microdisplay in the enclosure.

According to still another aspect of the present invention, each of the lenses includes a prism in a form that propagates an optical image being projected onto one edge of the prism to an optical path that a user can see an image formed per the optical image. The prism is also integrated with or stacked on an optical correcting lens that is complementary or reciprocal to that of the prism to form an integrated lens for the glasses. The optical correcting lens is provided to correct an optical path from the prism to allow the user to see through the integrated lens without optical distortions.

According to still another aspect of the present invention, one exemplary prism is a waveguide. Each of the integrated lenses includes an optical waveguide that propagates an optical image being projected onto one end of the waveguide to another end with an optical path that a user can see an image formed per the optical image. The waveguide may also be integrated with or stacked on an optical correcting lens to form an integrated lens for the glasses.

According to still another aspect of the present invention, the integrated lens may be further coated with one for more films with optical characteristics that amplify the optical image before the eyes of the user.

According to still another aspect of the present invention, the glasses include a few electronic devices (e.g., sensor or microphone) to enable various interactions between the wearer and the displayed content. Signals captured by a device (e.g., a depth sensor) are transmitted to the enclosure via wireless means (e.g., RF or Bluetooth) to eliminate the wired connections between the glasses and the enclosure.

According to still another aspect of the present invention, instead of using two optical cables to transport the images from two microdisplays, a single optical cable is used to transport the images from one microdisplay. The optical cable may go through either one of the temples of the glasses. A splitting mechanism disposed near or right on the bridge of the glasses is used to split the images into two versions, one for the left lens and the other for the right lens. These two images are then respectively projected into the prisms or waveguides that may be used in the two lenses.

According to still another aspect of the present invention, the optical cable is enclosed within or attached to functional multi-layer structures which form a portion of an article of clothing. When a user wears a shirt made or designed in accordance with one of the embodiment, the cable itself has less weight while the user can have more activities.

According to still another aspect of the present invention, an optical conduit is used to transport an optical image received from an image source (e.g., a microdisplay). The optical conduit is encapsulated in or integrated with a temple of the display device. Depending on implementation, the optical conduit comprising a bundle or an array of optical fibers may be twisted, thinned or otherwise deformed to fit with a stylish design of the temple while transporting an optical image from one end to another end of the temple.

To further reduce the weight of the display device, according to still another aspect of the present invention, an active optical cable is used as a communication medium between the display device and a portable device, where the portable device is wearable by or attachable to a user. The active optical cable includes two ends and at least one optical fiber and two wires, where the two ends are coupled by the optical fiber and two wires. The two wires carry power and ground to energize the two ends and the operation of the display device while the at least optical fiber is used to carry all data, control and instruction signals.

According to still another aspect of the present invention, the portable device may be implemented as a standalone device or a docking unit to receive a smartphone. The portable device is primarily a control box that is connected to a network (e.g., the Internet) and generates control and instruction signals when controlled by a user. When a smartphone is received in the docking unit, many functions provided in the smartphone may be used, such as the network interface and touch screen to receive inputs from the user.

The present invention may be implemented as an apparatus, a method, and a part of system. Different implementations may yield different benefits, objects and advantages. In one embodiment, the present invention is a pair of glasses comprising: at least a lens, a pair of temples, and a projection mechanism, disposed near an end of the temple, receiving an optical image from the temple and projecting the optical image into the lens. At least one temple includes an optical cable, wherein the optical cable is extended beyond the temple to receive the optical image optically picked up by a focal lens that projects the optical image onto one end of an optical cable. The optical cable includes at least one optical fiber to transport the optical image from one end of the optical cable to another end of the optical cable by total internal reflection in the optical fiber, and the optical image is projected onto the optical fiber by a focal lens from a displayed image on a microdisplay.

In another embodiment, the present invention is a display apparatus comprising: at least a lens, a pair of temples, at least one temple including an optical cable, wherein the optical cable is extended beyond the temple to receive an optical image, a projection mechanism, disposed near an end of the temple, receiving the optical image from the temple and projecting the optical image into the lens, and a sensor and an infrared lighting source disposed separately around the lens to image an eye looking at the optical image, wherein the eye being illuminated by the infrared lighting source. The projection mechanism includes a focal mechanism auto-focusing and projecting the optical image onto the first edge of the prism. The display apparatus further includes a wireless module provided to transmit wirelessly a sensing signal from the sensor to a case including a processor and circuitry to process the sensing signal and send a feedback signal to control the focal mechanism.

In still another embodiment, the present invention is a wearable display device. It comprises at least a lens, a temple, an optical block receiving an optical image from a microdisplay device, at least an optical conduit with a first end and a second end, and an integrated lens. The optical conduit is integrated within the temple. The first end coupled to the optical block and receiving the optical image therefrom. The optical image is transported to the second end by total internal reflections within the optical conduit. The integrated lens, coupled to the second end, receives the optical image from the optical conduit and presents the optical image for a user of the display device to view an image within the integrated lens.

In still another embodiment, the present invention is a method for transporting an optical image from a portable device to a wearable display device, the method comprises receiving the optical image from an optical cube, wherein the optical image is in a reversed aspect of ratio, the optical cube is attached with a microdisplay device and a light source, the optical image is formed by shining illumination (i.e., light intensities) from the light source onto the microdisplay device. The method further comprises projecting the optical image into an optical conduit including an array of optical fibers, and physically rotated by 90 degrees, rotating the optical image 90 degrees by transporting the optical image through the optical conduit by total internal reflections within the fibers, and receiving the optical image in a normalized aspect of ratio before projecting the optical image into an integrated lens for view therein by a viewer.

In still another embodiment, the present invention is a display apparatus comprising: at least one integrated lens; one active optical cable including two ends, at least one optical fiber and two wires, wherein the two ends are coupled by the at least one optical fiber and two wires. The display apparatus further comprises two temples, at least one of the temples enclosing the active optical cable; an image source integrated within a frame holding the at least one integrated lens, wherein the active optical cable, communicating with a portable device, receives image data from the active optical cable and generates an optical image per the image data, the optical image is projected into the integrated lens for view by a wearer.

In yet another embodiment, the present invention is a system comprising a pair of wearable display glasses including at least one integrated lens and one temple, the temple including an optical conduit transporting an optical image from one end of the temple to another end of the temple, wherein the optical image is projected into the integrated lens for a viewer to view an image formed from the optical image. The system further comprises a wearable docking unit including predefined circuitry to provide image data to generate the optical image; and an active optical cable including a first end, a second end, an array of optical fibers and at least two wires, the first and second ends being coupled by the optical fibers and wires.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 2D shows how an image is being transported from a microdisplay via a fiber cable to an imaging medium;

FIG. 2E shows a set of exemplary variable focus elements (VFE) to accommodate an adjustment of the projection of an image onto an optical object (e.g., an imaging medium or a prism);

FIG. 2I shows a shirt in which a cable is enclosed within the shirt or attached thereto;

FIG. 3A shows how three single color images are being combined visually and perceived as a full color image by human vision;

FIG. 3B shows that three different color images are generated under three lights respectively at wavelengths $\lambda 1$, $\lambda 2$, and $\lambda 3$, the imaging medium includes three films, each coated with a type of phosphor.

FIG. 4 shows that an waveguide is used to transport an optical image from one end of the waveguide to another end thereof;

FIG. 7B shows a conduit shaped as a part of a temple of glasses;

FIG. 8A shows what is called herein an active optical cable that includes two ends and a plurality of fibers coupled between the two ends;

DETAILED DESCRIPTION OF THE PREFERRED EMBODIMENTS

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 2A-10B. However, those skilled in the art will readily appreciate that the detailed description given herein with respect to these figures is for explanatory purposes as the invention extends beyond these limited embodiments.

Figure 1A:
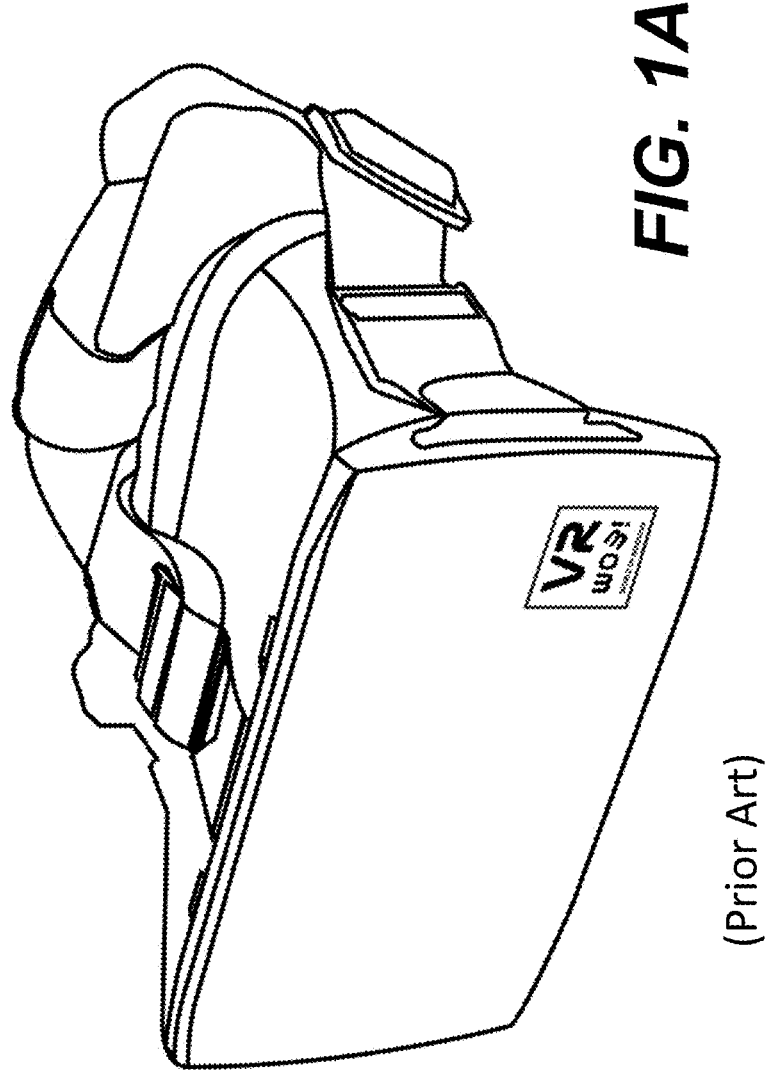
FIG. 1A shows an exemplary goggle now commonly seen in the market for the application of delivering or displaying VR or AR.
Figure 1B:
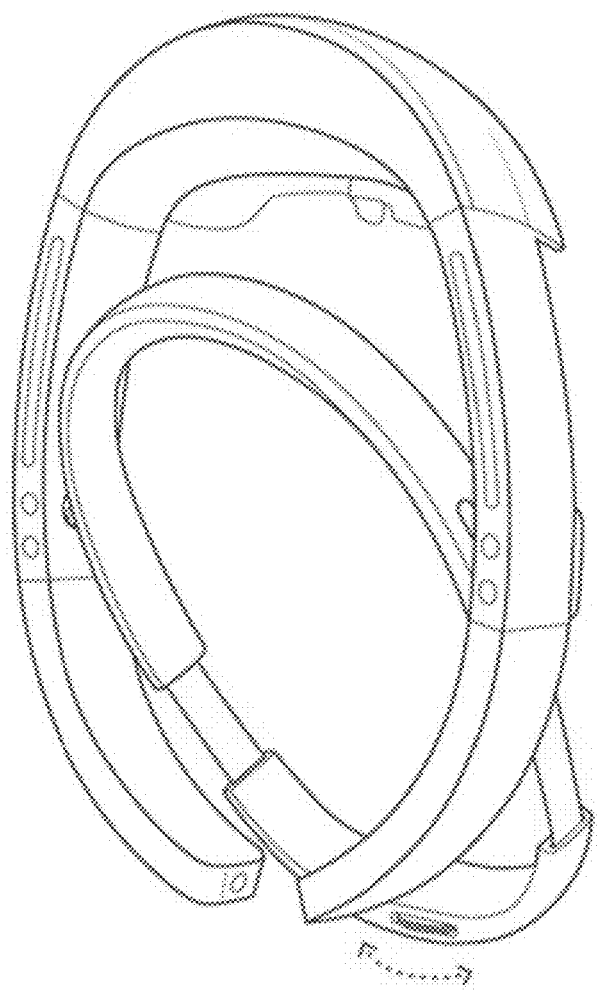
FIG. 1B shows a sketch of HoloLens from Microsoft.
Figure 2A:
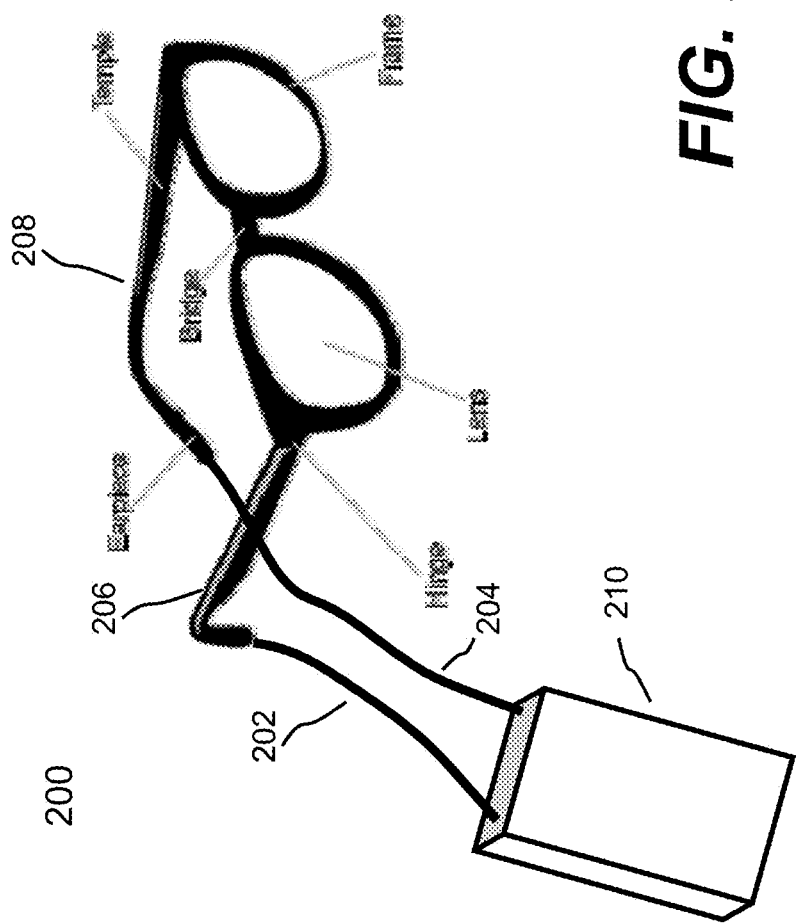
FIG. 2A shows a pair of exemplary glasses that can be used for the application of VR according to one embodiment of the present invention.

Referring now to the drawings, in which like numerals refer to like parts throughout the several views. FIG. 2A shows a pair of exemplary glasses 200 that are used for applications of VR/AR according to one embodiment of the present invention. The glasses 200 appear no significant difference to a pair of normal glasses but include two flexible cables 202 and 204 that are respectively extended from the temples 206 and 208. According to one embodiment, each pair of the two flexible cables 202 and the temples 206 and 208 are integrated or removably connected at one end thereof and include one or more optical fibers.

Both of flexible cables 202 are coupled at another end thereof to a portable computing device 210, where the computing device 210 generates images based on a microdisplay that are captured by the cables 202. The images are transported through the optical fibers in the flexible cables 202 by the total internal reflections therein all the way to another end of the optical fibers, where the images are projected onto the lenses in the glasses 200.

Figure 2B:
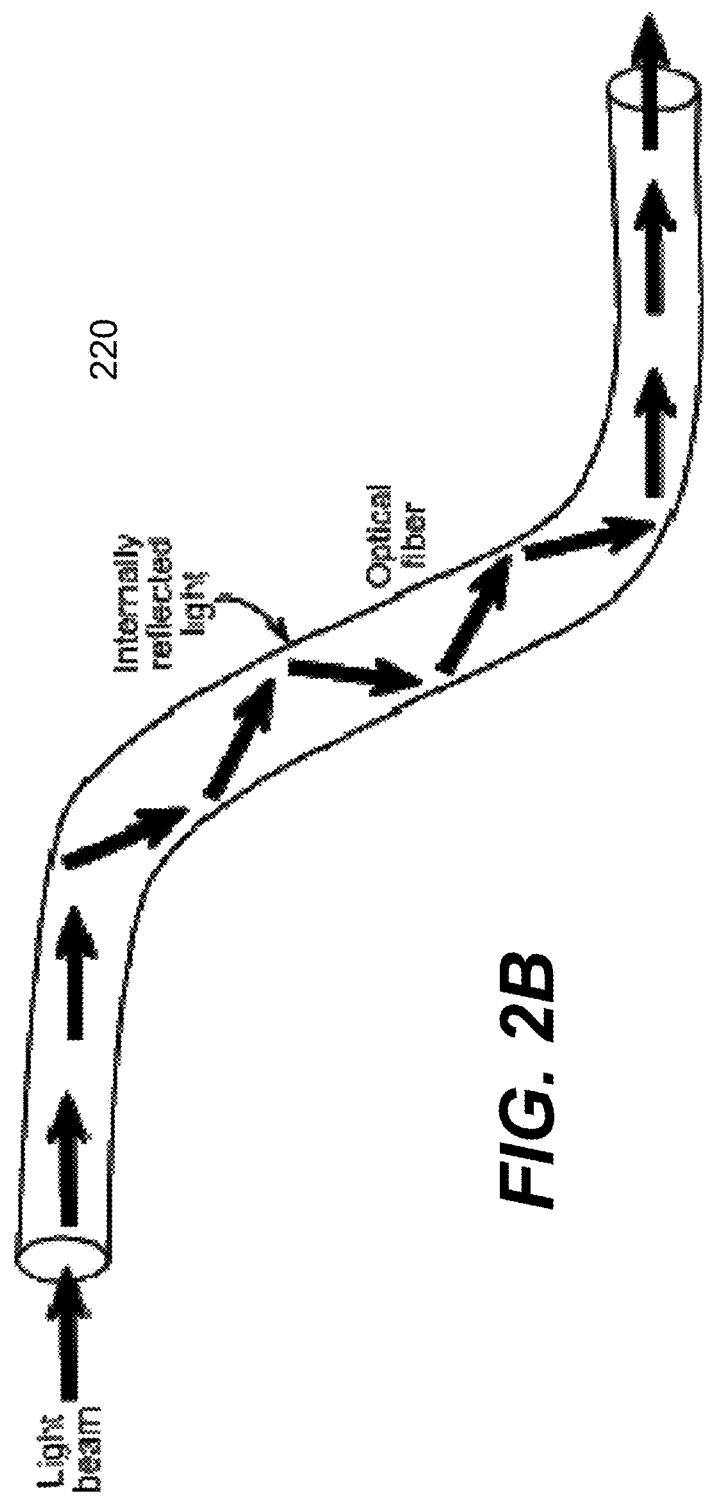
FIG. 2B illustrates that an optical fiber is used to transmit light from one place to the other along curved path in a more effective manner or by total internal reflections within the fiber.

According to one embodiment, each of the two flexible cables 202 includes one or more optical fibers. Optical fibers are used to transmit light from one place to the other along curved path in a more effective manner as shown in FIG. 2B. In one embodiment, the optical fibers are formed with thousands of strands of a very fine quality glass or quartz of refractive index about 1.7 or so. The thickness of a strand is tine. The strands are coated with a layer of some material of lower refractive index. The ends of the strands are polished and clamped firmly after aligning them carefully. When light is incident at a small angle at one end, it gets refracted into the strands (or fibers) and gets incident on the interface of the fibers and the coating. The angle of incidence being greater than the critical angle, the ray of light undergoes total internal reflections and essentially transports the light from one end to another end even if the fiber is bent. Depending on the implementation of the present invention, a single fiber or a plurality of fibers arranged in parallel may be used to transport an optical image projected onto one end of the fiber or fibers to another end thereof.

Figure 2C:
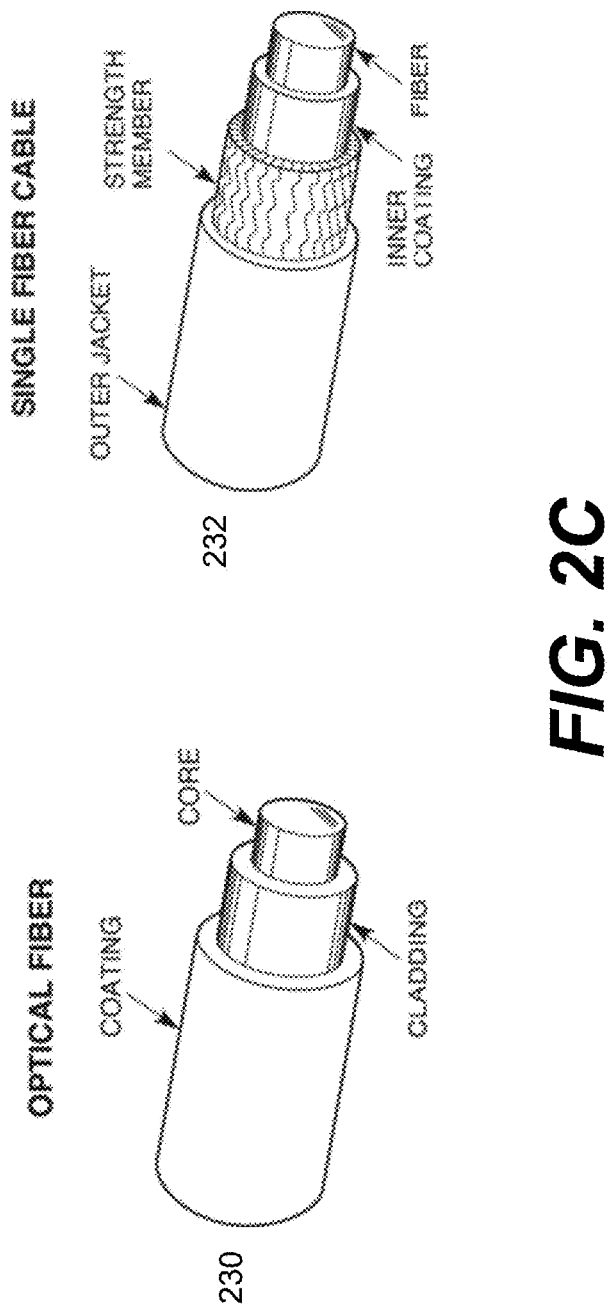
FIG. 2C shows two exemplary ways to encapsulate a fiber or a plurality of fibers according to one embodiment of the present invention.

FIG. 2C shows two exemplary ways to encapsulate a fiber or a plurality of fibers according to one embodiment of the present invention. The encapsulated fiber or fibers may be used as the cable 202 or 204 in FIG. 2A and extended through each of the non-flexible temples 206 and 208 all the way to the end thereof. According to one embodiment, the temples 206 and 208 are made of a type of material (e.g., plastic or metal) commonly seen in a pair of regular glasses, a portion of the cable 202 or 204 is embedded or integrated in the temple 206 or 208, resulting in a non-flexible part while another portion of the cable 202 or 204 remains flexible. According to another embodiment, the non-flexible part and the flexible part of the cable 202 or 204 may be removably connected via a type of interface or connector.

Referring now to FIG. 2D, it shows how an image is being transported from a microdisplay 240 via a fiber cable 242 to an imaging medium 244. As will be further described below, an imaging medium 244 may be a physical thing (e.g., films) or non-physical thing (e.g., the air). A microdisplay is a display that has a very small screen (e.g., less than an inch). This type of tiny electronic display system was introduced commercially in the late 1990s. The most common applications of microdisplays include rear-projection TVs and head-mounted displays. Microdisplays may be reflective or transmissive depending upon the way light is allowed to pass through the display unit. Through a lens 246, an image (not shown) displayed on the microdisplay 240 is picked up by one end of the fiber cable 242 that transports the image to the other end of the fiber cable 242. Another lens 248 is provided to collect the image from the fiber cable 242 and projects it to the imaging medium 244. Depending on the implementation, there are different types of microdisplays and imaging mediums. Some of the embodiments of the microdisplays and imaging mediums will be described in detail below.

FIG. 2E shows a set of exemplary variable focus elements (VFE) 250 to accommodate an adjustment of the projection of an image onto an optical object (e.g., an imaging medium or a prism). To facilitate the description of various embodiments of the present invention, it is assumed that there is an image medium. As illustrated in FIG. 2E, an image 252 transported by a fiber cable reaches the end surface 254 of the fiber cable. The image 252 is focused by a set of lens 256, referred to herein as variable focus elements (VFE), onto an imaging medium 258. The VFE 256 is provided to be adjusted to make sure that the image 252 is precisely focused onto the imaging medium 258. Depending on the implementation, the adjustment of the VFE 256 may be done manually or automatically in accordance with an input (e.g., a measurement obtained from a sensor). According to one embodiment, the adjustment of the VFE 256 is performed automatically in accordance with a feedback signal derived from a sensing signal from a sensor looking at an eye (pupil) of the wearer wearing the glasses 200 of FIG. 2A.

Figure 2F:
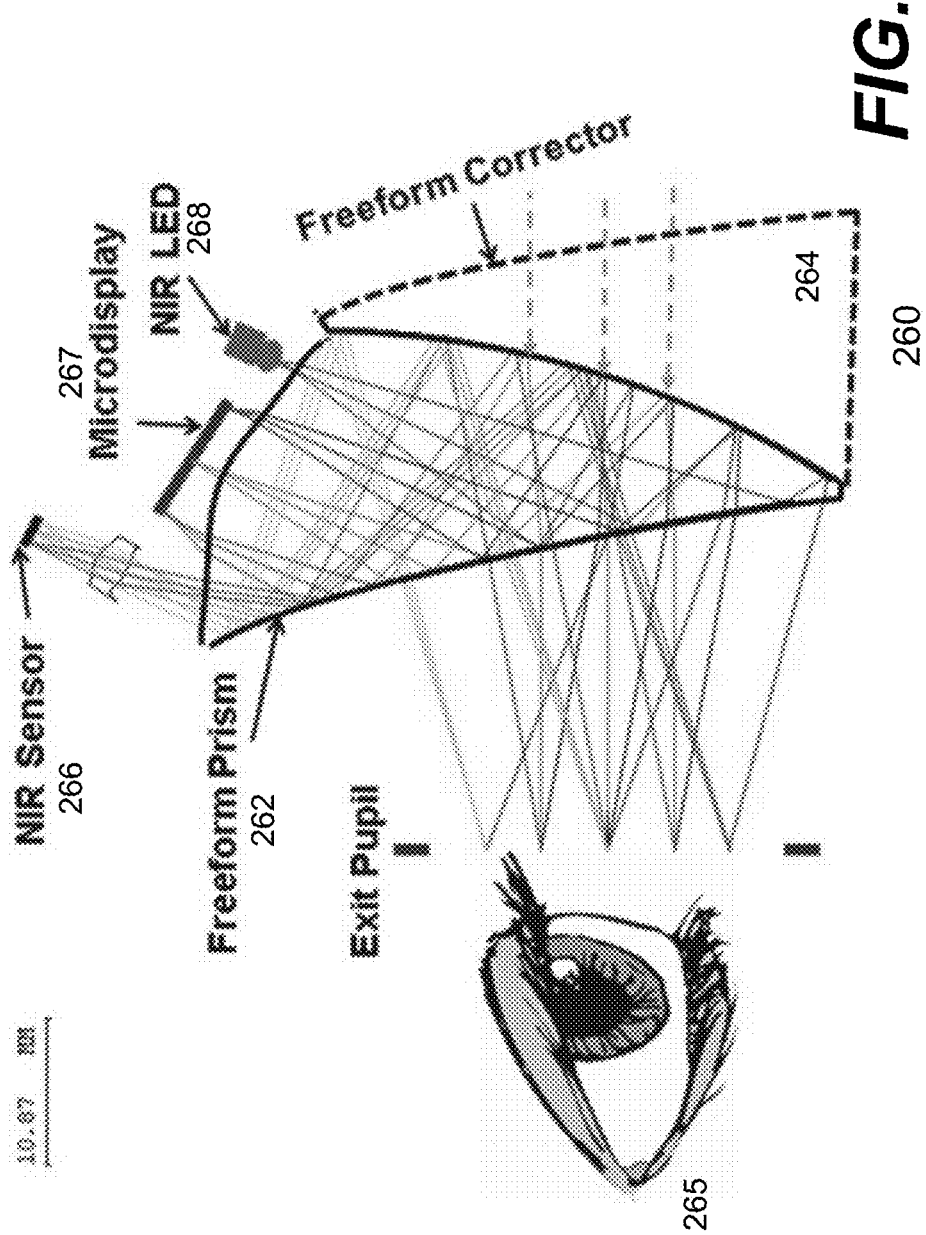
FIG. 2F shows an exemplary lens that may be used in the glasses shown in FIG. 2A, where the lens includes two parts, a prism and an optical correcting lens or corrector.

Referring now to FIG. 2F, it shows an exemplary lens 260 that may be used in the glasses shown in FIG. 2A. The lens 260 includes two parts, a prism 262 and an optical correcting lens or corrector 264. The prism 262 and the corrector 264 are stacked to form the lens 260. As the name suggests, the optical corrector 264 is provided to correct the optical path from the prism 262 so that a light going through the prism 262 goes straight through the corrector 264. In other words, the refracted light from the prism 262 is corrected or de-refracted by the corrector 264. In optics, a prism is a transparent optical element with flat, polished surfaces that refract light. At least two of the flat surfaces must have an angle between them. The exact angles between the surfaces depend on the application. The traditional geometrical shape is that of a triangular prism with a triangular base and rectangular sides, and in colloquial use a prism usually refers to this type. Prisms can be made from any material that is transparent to the wavelengths for which they are designed. Typical materials include glass, plastic and fluorite. According to one embodiment, the type of the prism 262 is not in fact in the shape of geometric prisms, hence the prism 262 is referred herein as a freeform prism, which leads the corrector 264 to a form complementary, reciprocal or conjugate to that of the prism 262 to form the lens 260.

On one edge of the lens 260 or the edge of the prism 262, there are at least three items utilizing the prism 262. Referenced by 267 is an imaging medium corresponding to the imaging medium 244 of FIG. 2D or 258 of FIG. 2E. Depending on the implementation, the image transported by the optical fiber 242 of FIG. 2D may be projected directly onto the edge of the prism 262 or formed on the imaging medium 267 before it is projected onto the edge of the prism 262. In any case, the projected image is refracted in the prism 262 and subsequently seen by the eye 265 in accordance with the shapes of the prism 262. In other words, a user wearing a pair of glasses employing the lens 262 can see the image being displayed through or in the prism 262.

A sensor 266 is provided to image the position or movement of the pupil in the eye 265. Again, based on the refractions provided by the prism 262, the location of the pupil can be seen by the sensor 266. In operation, an image of the eye 265 is captured. The image is analyzed to derive how the pupil is looking at the image being shown through or in the lens 260. In the application of AR, the location of the pupil may be used to activate an action. Optionally, a light source 268 is provided to illuminate the eye 265 to facilitate the image capture by the sensor 266. According to one embodiment, the light source 268 uses a near inferred source as such the user or his eye 265 would not be affected by the light source 268 when it is on.

Figure 2G:
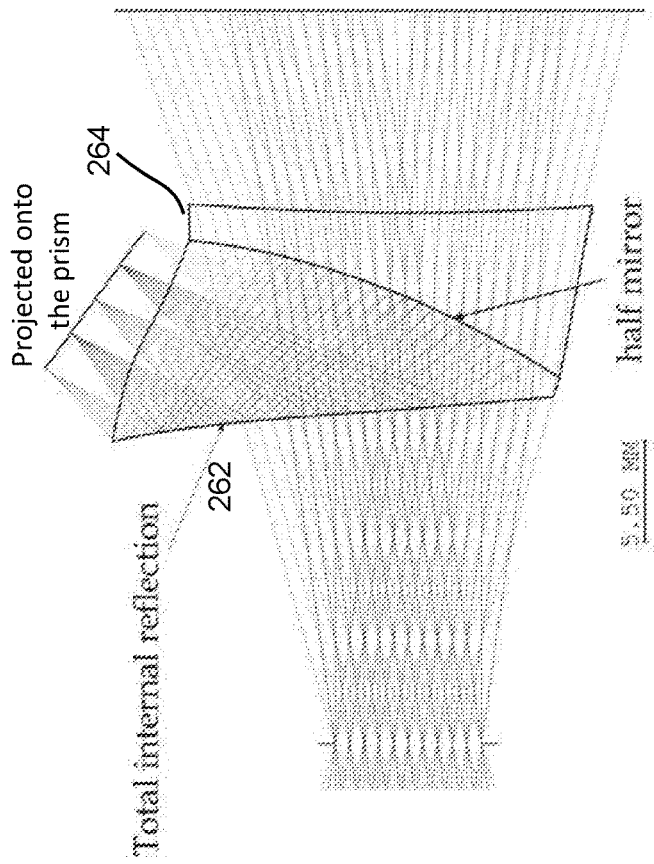
FIG. 2G shows the internal reflections from a plurality of sources (e.g., a sensor, an imaging medium and a plurality of light sources) in an irregular prism.
Figure 2H:
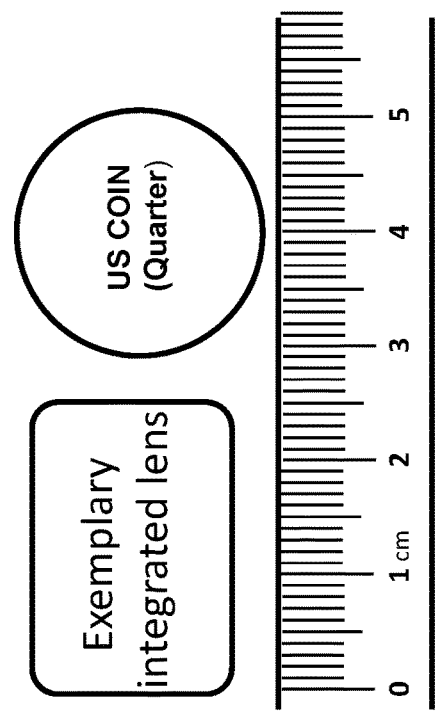
FIG. 2H shows a comparison of such an integrated lens to a coin and a ruler.

FIG. 2G shows the internal reflections from a plurality of sources (e.g., the sensor 266, the imaging medium 267 and the light source 268). As the prism is uniquely designed in particular shapes or to have particular edges, the rays from the sources are reflected several times within the prism 268 and subsequently impinge upon the eye 265. For completeness, FIG. 2H shows a comparison of such a lens to a coin and a ruler in sizes.

As described above, there are different types of microdisplays, hence different imaging mediums. The table below summarizes some of the microdisplays that may be used to facilitate the generation of an optical image that can be transported by one or more optical fibers one end to another end thereof by total internal reflection within the optical fiber(s).

| No. | Microdisplay types | Features | Notes |
|---|---|---|---|
| 1 | LCoS (LCD and OLED) | Full color image displayed on a silicon | A single image |
| 2 | LCoS + LED (RGB sequentially) LCoS + laser (visible, RGB sequentially) LCoS + laser (non-visible) | A single color image displayed at a time | Three images |
| 3 | SLM + laser (RGB sequentially) | A single optical color image | Three optical images |
| 4 | SLM + laser (non-visible) | A single non-visible color image | Need conversion |

LCoS = Liquid crystal on silicon;
LCD = Liquid crystal display;
OLED = Organic light-emitting diode;
RGB = Red, Green and Blue; and
SLM = Spatial light modulation.

In the first case shown above in the table, a full color image is actually displayed on a silicon device (e.g., LCoS). As shown in FIG. 2D, the full color image can be picked up by a focal lens or a set of lenses that project the full image right onto one end of the fiber. The image is transported within the fiber and picked up again by another focal lens at the other end of the fiber. As the transported image is visible and full color, the imaging medium 244 of FIG. 2D may not be physically needed. The color image can be directly projected onto one edge of the prism 262 of FIG. 2F.

In the second case shown above in the table, an LCoS is used with different light sources. In particular, there are at least three colored light sources (e.g., red, green and blue) used sequentially. In other words, a single color image is generated per one light source. The image picked up by the fiber is only a single color image. A full color image can be reproduced when all three different single color images are combined. The imaging medium 244 of FIG. 2D is provided to reproduce the full color image from the three different single color images transported respectively by the optical fiber.

FIG. 2I shows a shirt 270 in which a cable 272 is enclosed within the shirt 270 or attached thereto. The shirt 270 is an example of fabric material or multi-layers. Such a relatively thin cable can be embedded into the multi-layers. When a user wears such a shirt made or designed in accordance with one of the embodiment, the cable itself has less weight while the user can have more freedom to move around.

FIG. 3A shows how three single color images 302 are being combined visually and perceived as a full color image 304 by human vision. According to one embodiment, three colored light sources are used, for example, red, green and blue light sources that are turned sequentially. More specifically, when a red light source is turned on, only a red image is produced as a result (e.g., from a microdisplay). The red image is then picked up optically and transported by the fiber, and subsequently projected into the prism 262 of FIG. 2F. As the green and blue lights are turned on afterwards and sequentially, the green and blue images are produced and transported respectively by the fiber, and subsequently projected into the prism 262 of FIG. 2F. It is well known that human vision possesses the ability of combining the three single color images and perceives them as a full color image. With the three single color images projected sequentially into the prism, all perfectly registered, the eye sees a full color image.

Also in the second case shown above, the light sources can be nearly invisible. According to one embodiment, the three light sources produce lights near UV band. Under such lighting, three different color images can still be produced and transported but are not very visible. Before they can be presented to the eyes or projected into the prism, they shall be converted to three primary color images that can subsequently be perceived as a full color image. According to one embodiment, the imaging medium 244 of FIG. 2D is provided. FIG. 3B shows that three different color images 310 are generated under three light sources respectively at wavelengths $\lambda 1$, $\lambda 2$, and $\lambda 3$, the imaging medium 312 includes three films 314, each coated with a type of phosphor, a substance that exhibits the phenomenon of luminescence. In one embodiment, three types of phosphor at wavelength 405 nm, 435 nm and 465 nm are used to convert the three different color images produced under the three light sources near UV band. In other words, when one such color image is projected onto a film coated with the phosphor at a wavelength 405 nm, the single color image is converted as a red image that is then focused and projected into the prism. The same process is true with other two single color images that go through a film coated with phosphor at wavelength 435 nm or 465 nm, resulting in green and blue images. When such red, green and blue images are projected sequentially into the prism, a human vision perceives them together as a full color image.

In the third or fourth case shown above in the table, instead of using a light either in the visible spectrum or near invisible to human eyes, the light source uses a laser source. There are also visible lasers and non-visible lasers. Operating not much differently from the first and second cases, the third or fourth case uses what is called spatial light modulation (SLM) to form a full color image. A spatial light modulator is a general term describing devices that are used to modulate amplitude, phase, or polarization of light waves in space and time. In other words, SLM+laser (RGB sequentially) can produce three separate color images. When they are combined with or without the imaging medium, a full color image can be reproduced. In the case of SLM+laser (non-visible), the imaging medium shall be presented to convert the non-visible images to a full color image, in which case, appropriate films may be used as shown in FIG. 3B.

Referring now to FIG. 4, it shows that an waveguide 400 is used to transport an optical image 402 from one end 404 of the waveguide 400 to another end 406, wherein the waveguide 400 may be stacked with one or more pieces of glass or lenses (not shown) or coated with one or more films to from a suitable lens for a pair of glasses for the applications of displaying images from a computing device. It is known to those skilled in that art that an optical waveguide is a spatially inhomogeneous structure for guiding light, i.e. for restricting the spatial region in which light can propagate, where a waveguide contains a region of increased refractive index, compared with the surrounding medium (often called cladding).

The waveguide 400 is transparent and shaped appropriately at the end of 404 to allow the image 402 to be propagated along the waveguide 400 to the end 406, where a user 408 can see through the waveguide 400 so as to see the propagated image 410. According to one embodiment, one or more films are disposed upon the waveguide 400 to amplify the propagated image 410 so that the eye 408 can see a significantly amplified image 412. One example of such films is what is called metalenses, essentially an array of thin titanium dioxide nanofins on a glass substrate.

Figure 5:
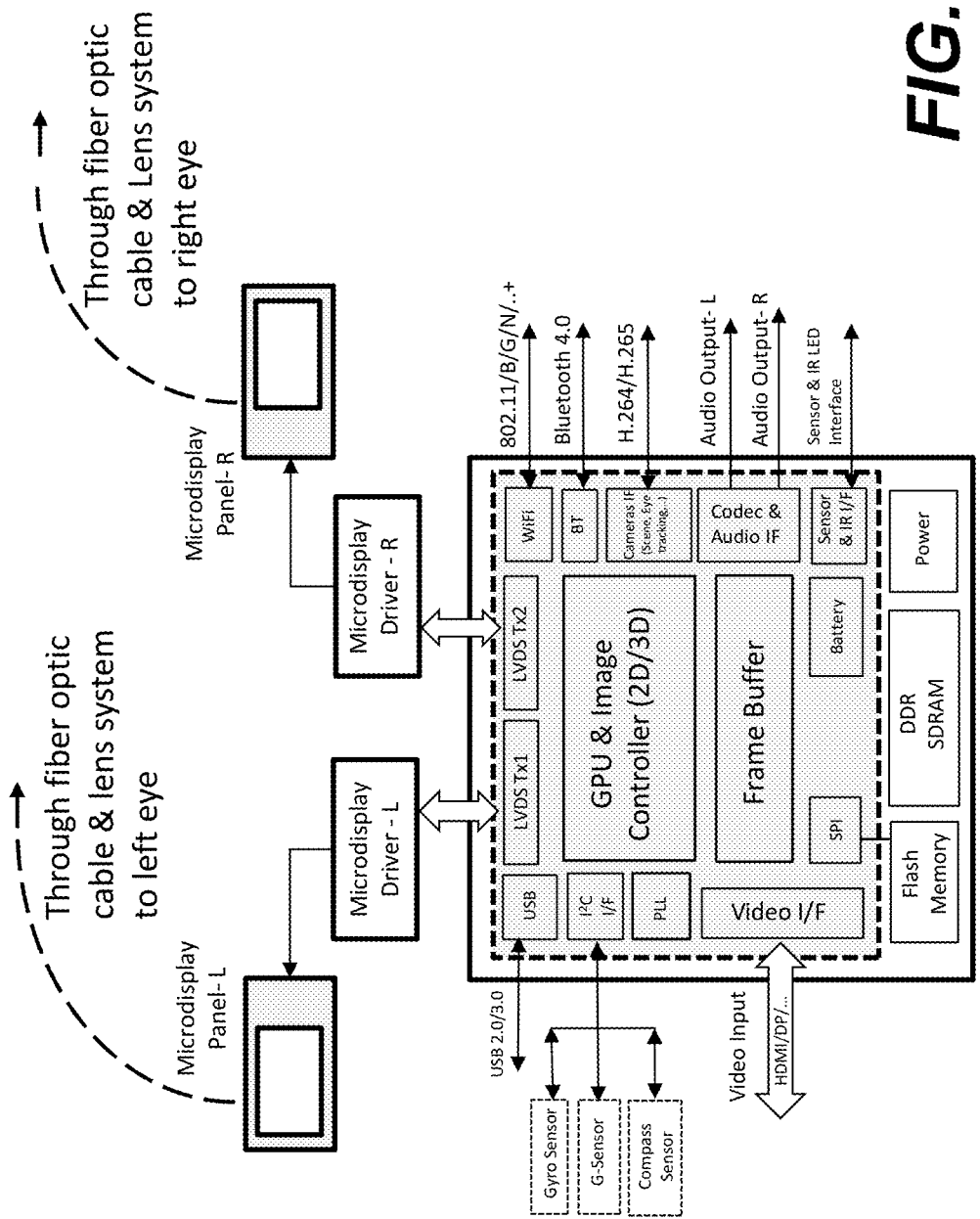
FIG. 5 shows an exemplary functional block diagram that may be used in a separate case or enclosure to produce content related to virtual reality and augmented reality for display on the exemplary glasses of FIG. 2A.

Referring now to FIG. 5, it shows an exemplary functional block diagram 500 that may be used in a separate case or enclosure to produce content related to virtual reality and augmented reality for display on the exemplary glasses of FIG. 2A. As shown in FIG. 5, there are two microdisplays 502 and 504 provided to supply content to both of lenses in the glasses of FIG. 2A, essentially a left image goes to the left lens and a right image goes to the right lens. An example of the content is 2D or 3D images and video, or hologram. Each of the microdisplays 502 and 504 is driven by a corresponding driver 506 or 508.

The entire circuit 500 is controlled and driven by a controller 510 that is programmed to generate the content. According to one embodiment, the circuit 500 is designed to communicate with the Internet (not shown), receive the content from other devices. In particular, the circuit 500 includes an interface to receive a sensing signal from a remote sensor (e.g., the sensor 266 of FIG. 2F) via a wireless means (e.g., RF or Bluetooth). The controller 510 is programmed to analyze the sensing signal and provides a feedback signal to control certain operations of the glasses, such as a projection mechanism that includes a focal mechanism auto-focusing and projecting the optical image onto an edge of the prism 262 of FIG. 2F. In addition, the audio is provided to synchronize with the content, and may be transmitted to earphones wirelessly.

FIG. 5 shows an exemplary circuit 500 to produce the content for display in a pair of glasses contemplated in one embodiment of the present invention. The circuit 500 shows that there are two microdisplays 502 and 504 used to provide two respective images or video streams to the two lenses of the glasses in FIG. 2A. According to one embodiment, only one microdisplay may be used to drive the two lenses of the glasses in FIG. 2A. Such a circuit is not provided herein as those skilled in the art know how the circuit can be designed or how to modify the circuit 500 of FIG. 5.

Figure 6A:
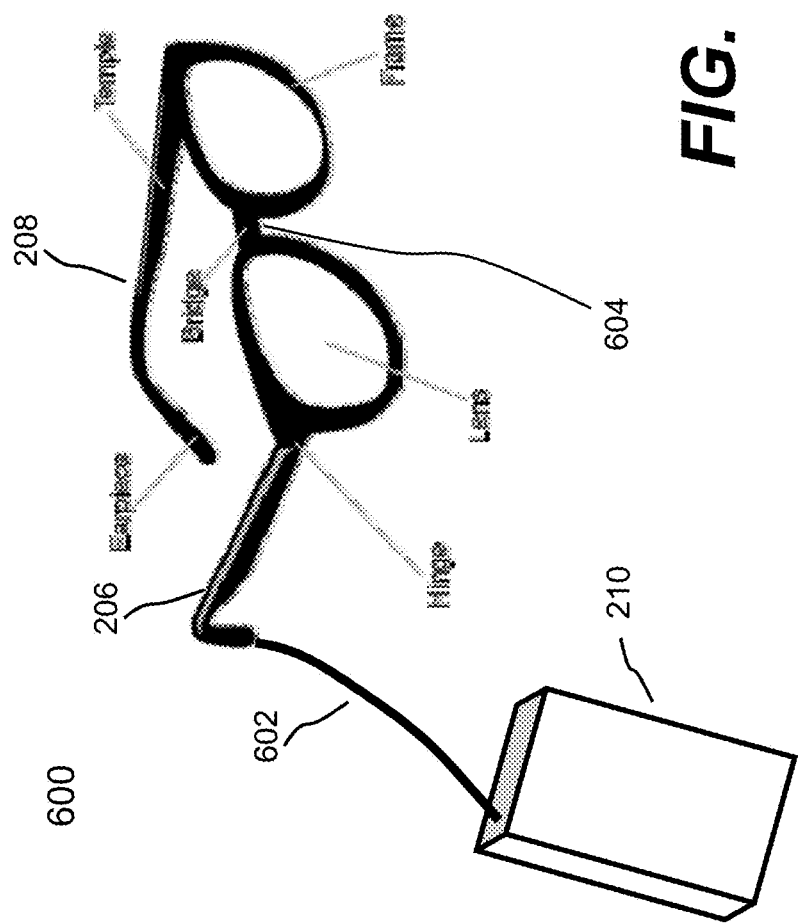
FIG. 6A shows a modified version of FIG. 2A in which a splitting mechanism is used to split an image propagated or transported by an optical cable into two parts (e.g., a left and a right image)

Given one video stream or one image, the advantage is that there is only one optical cable needed to transport the image. FIG. 6A shows a modified version 600 of FIG. 2A to show that one cable 602 is used to couple the enclosure 210 to the glasses 208. Instead of using two optical cables to transport the images from two microdisplays as shown in FIG. 2A, a single optical cable is used to transport the images from one microdisplay. The optical cable may go through either one of the temples of the glasses and perhaps further to part of one top frame. A splitting mechanism disposed near or right on the bridge of the glasses is used to split the images into two versions, one for the left lens and the other for the right lens. These two images are then respectively projected into the prisms or waveguides that may be used in the two lenses.

Figure 6B:
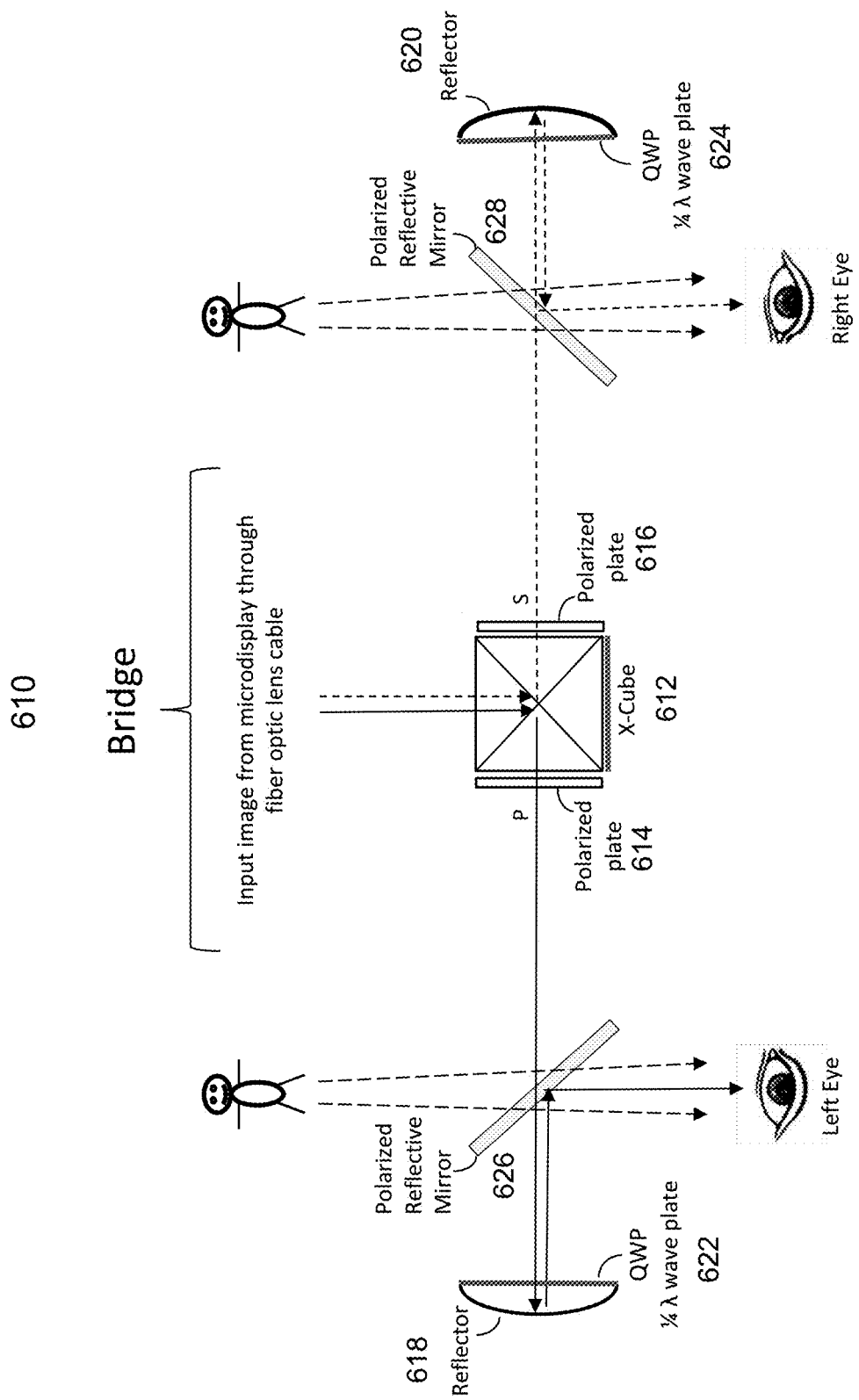
FIG. 6B shows an exemplary splitting mechanism according to one embodiment of the present invention.

To split the image propagated or transported by the cable 602, the glasses 600 are designed to include a splitting mechanism 604 that is preferably disposed near or at the bridge thereof. FIG. 6B shows an exemplary splitting mechanism 610 according to one embodiment of the present invention. A cube 612, also called X-cube beam splitter used to split incident light into two separate components, is provided to receive the image from a microdisplay via the cable 602. In other words, the image is projected onto one side of the X-cube 612. The X-cube 612 is internally coated with certain reflecting materials to split the incident image into two parts, one goes to the left and the other goes to the right as shown in FIG. 6B. A split image goes through a polarized plate 614 or 616 to hit a reflector 618 or 620 that reflects the image back to the polarized reflective mirror 626 or 628. The two polarized plates 614 and 616 are polarized differently (e.g., in horizontally and vertically or circular left and right) corresponding to the images sequentially generated either for left eye or right eye. Coated with certain reflective material, the polarized reflective mirror 626 or 628 reflects the image to the corresponding eye. Depending on the implementation, the reflected image from the polarized reflective mirror 626 or 628 may be impinged upon one edge of the prism 262 of FIG. 2F or the waveguide 400 of FIG. 4. Optionally, two wave plates 622 and 624 are respectively disposed before the reflectors 618 and 620.

Figure 7A:
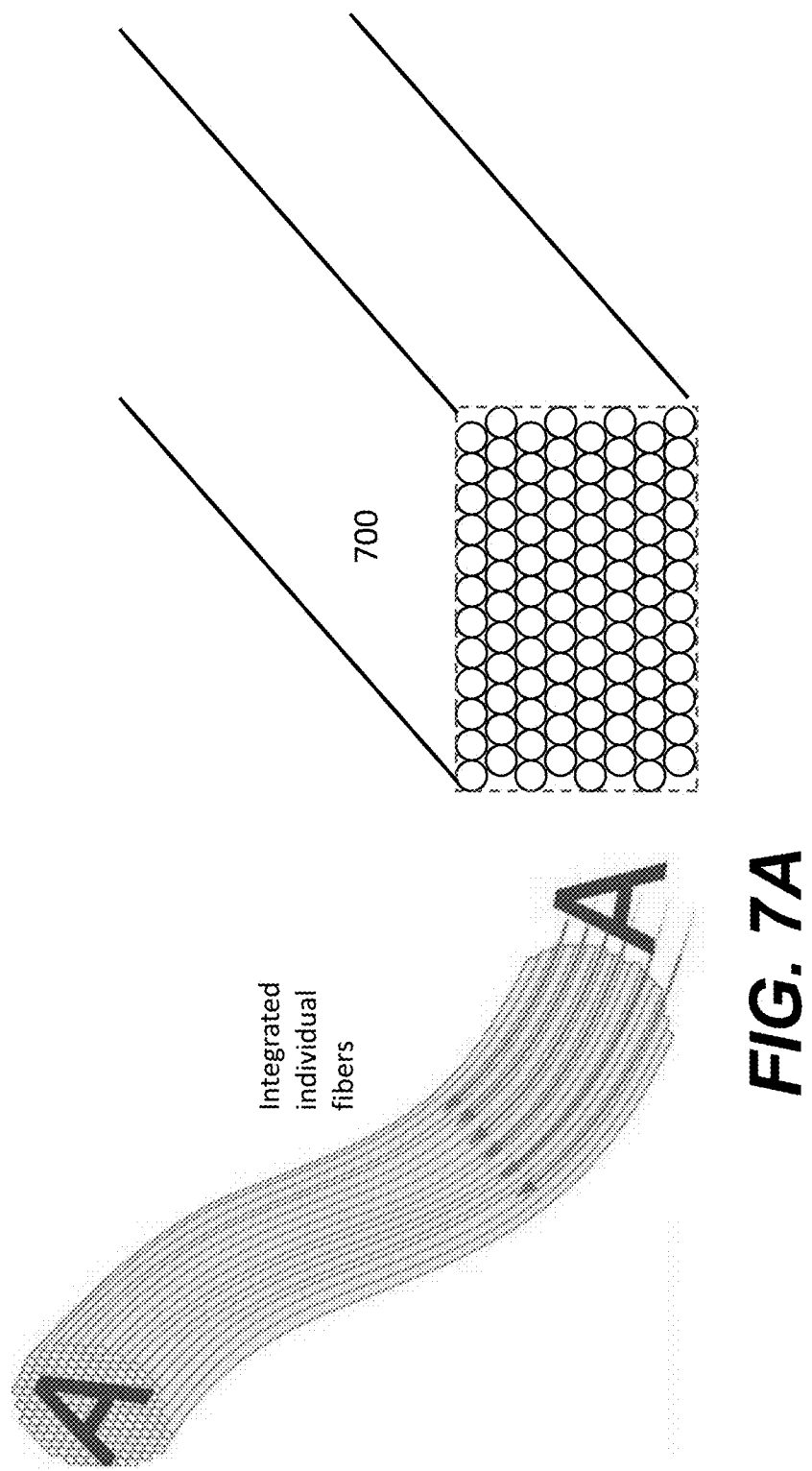
FIG. 7A shows an exemplary integration of a plurality of individual fibers integrated and shaped to form an optical fiber conduit.

FIG. 2B or FIG. 2D shows an optical fiber cable 220 or 242 is used to transport an image from one end to another end. The use of the optical fibers, typically encapsulated in a flexible material such as plastic, can significantly reduce the weight of the glasses. According to one embodiment, a fiber cable is made with a plurality of optical fibers integrated in parallel to form an optical fiber conduit. FIG. 7A shows an exemplary integration of an optical fiber conduit 700. A plurality of individual fibers are integrated and shaped to form an optical fiber conduit 700 with a cross section thereof being a predefined shape (e.g., rectangular or square). When an optical image is projected onto one end of the conduit 700, light beams of the image travel respectively in the fibers by total internal reflections in each of the fibers and reach another end of the conduit 700.

Referring now to FIG. 7B, it shows a conduit 710 is shaped as a part of a temple of the glasses. In general, an image being projected onto one end of the conduit 710 has an aspect of ratio of 4:3 or 16:9. Regardless of an exact number of the ratio (an attribute describes the relationship between the width and height of an image), the horizontal dimension of the image is often longer than the vertical dimension. Preferably, the conduit 710 is in a shape having a ratio similar to that of the image, which would result in the temple appearing thick horizontally. According to one embodiment, the conduit 710 is twisted by 90 degrees in certain part. In other words, the conduit 710 starts with a ratio inversely similar to that of the image and then ends with a ratio similar to that of the image. For an image with a ratio of 16:9 (i.e., horizontal:vertical), a first part of the conduit 200 is made with a ratio of 9:16 and a second part of the conduit 200 is made with a ratio of 16:9. One of the important advantages, benefits and objectives of this implementation is to have the two temples of the glasses designed to look less bulky (i.e., sleek or stylish) even when they are used inherently or include a conduit to transport images or videos.

FIG. 7B shows that the conduit 710 is twisted by 90 degrees near one end of the conduit 710. An optical image is projected from an image source 712 onto a beginning part 714 of the conduit 200, where the image source 712 may be readily rotated to accommodate the shape of the beginning interface 714. It is assumed that an image from the image source has a ratio of 9:16. As a result, the first portion 716 of the conduit 710 can be made thinner horizontally than vertically. The conduit 710 is then rotated by 90 degrees in a second part 718 of the conduit 710, the image is also rotated by 90 degrees. As a result, the image coming out of an ending part 720 of the conduit 710 has an aspect ratio of 16:9 and may be projected into an integrated lens (e.g., 260 of FIG. 2F) or a waveguide (e.g., 400 of FIG. 4) for normal viewing.

Depending on the implementation, the image source 712 may be simply a projection from the optical fiber cable 220 or 242 of FIG. 2B or FIG. 2D, an optical image generated from a micro display device (microdisplay) 222 or an optical cube providing an optical image. According to one embodiment, the micro display device 222 (e.g., an LCOS) is provided to generate an optical image that is projected into the optical cube 712. Two enlarged versions of the cube 712 are also shown in FIG. 7B. In one embodiment, the cube 714 includes two optical pieces or blocks 717 and 718 in triangular shape. A special optical material or film 720 is provided between the two blocks 717 and 718. A light source 722 projects a light into the block 717. The light is then turned to the microdisplay 222 by the film 720 to shine the microdisplay 222. The microdisplay 222 generates the optical image with the light from the light source 722. The image is then reflected into the block 718 and passes through the film 720. The image is further projected onto the beginning part 714 of the conduit 710 for transmission within the conduit 710 to the second end 720 thereof. One of the important advantages, benefits and advantages in this implementation is the use of optical fibers to transmit an image from one end to another end without significantly increasing the metal weight that would be otherwise present when a cable with an array of wires is used. According to one embodiment, a waveguide 726 is provided to transport the projected optical image to a proper position and form an image based on the projected optical image.

Figure 7E:
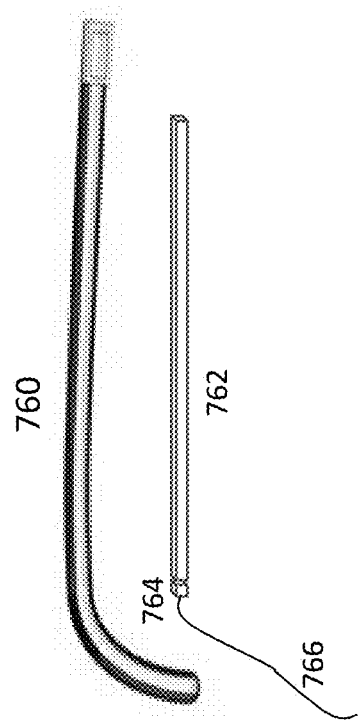
FIG. 7E shows an example of a temple that may be used in the display glasses described in the present invention, where the temple includes an optical conduit.
Figure 7C:
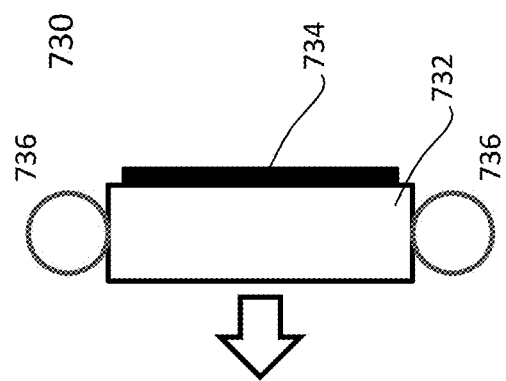
FIG. 7C shows an implementation of a light source that may be used as the light source of FIG. 7B.

According to one embodiment, FIG. 7C shows an implementation of the light source 730 that may be used as the light source 722 of FIG. 7B. The light source 730 includes a light guide 732, a shade 734 and a number of lights 736 (two of which are shown). Illumination from the lights 736 is projected into the guide 732. In one embodiment, the shade 734 is reflective on one side and opaque on the other side. Such a shade 734 is provided to reflect the illumination onto the block 717, besides preventing any of the illumination from going out of the guide 730. In other words, the shade 734 may be made with a film with one side being reflective and the other side being opaque.

Figure 7D:
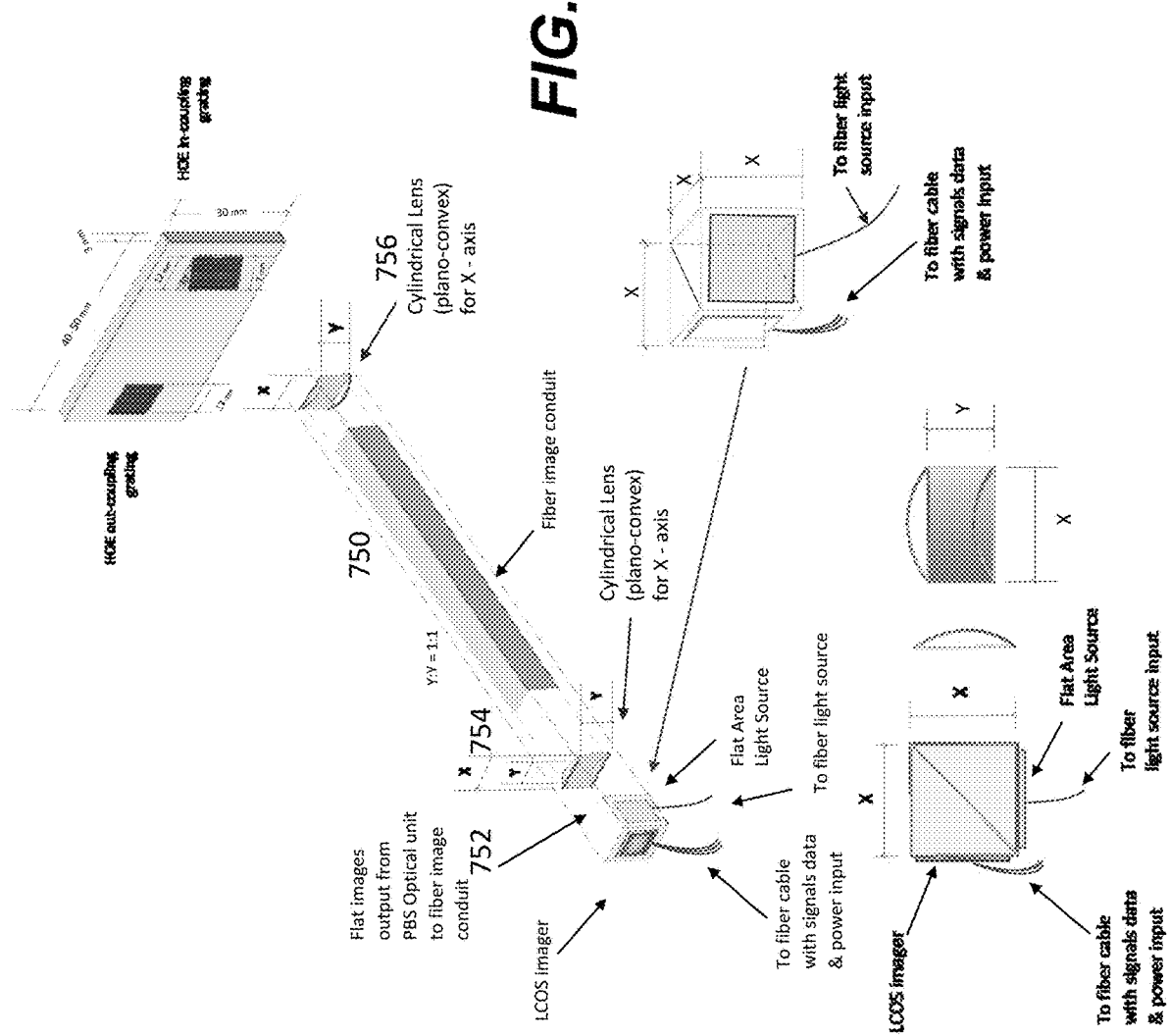
FIG. 7D shows one embodiment in which an optical conduit is not rotated while receiving an optical image with the standard orientation.

The description of FIG. 7B is based on the assumption that the received optical image at the first end 714 of the conduit 710 is already rotated by 90 degrees. Therefore the conduit is made to rotate 90 degrees back to normalize the image orientation. Those skilled in the art may appreciate that the above description is equally applicable to a received image rotated by any degree, in which case the conduit 710 can be made to rotate back an equal amount to normalize the image orientation. FIG. 7D shows one embodiment in which an optical conduit 750 is not rotated while receiving an optical image with the standard orientation (e.g., maintaining an aspect ratio of 16:9 or 4:3). An optical image from the image source 752 is made to pass through an optical lens 754 that may shrink the image vertically or horizontally or both accordingly. To facilitate the description of the present invention, it is assumed that the lens 754 only shrinks a received image horizontally by a predefined amount (e.g., 70%). As a result, the width or thickness of the conduit 750 can be made thinner. On the other end of the conduit 750, there is a second lens 756. Optically, the lens 756 does the opposite of what the lens 754 does, namely expanding the image horizontally by a predefined amount (e.g., 1/0.70), to recover the dimensions of the original image from the cube 752.

In operation, an optical image with an aspect of ratio being X:Y (e.g., 16:9) from the image source 752 is projected through the (horizontally shrinking) lens 754. The aspect of ratio is now Y:Y (e.g., 9:9). The optically distorted image is transported through the conduit 750 and then is projected through the lens 756. As described above, the lens 756 expands a light beam horizontally, resulting in the recovery of the optically distorted image to a normal image with an aspect of ration being X:Y (16:9). One of the advantages, benefits and objectives of this embodiment is to have a temple designed normally or with style, even when it is used to transport optical images or videos therein. In other words, the conduit 750 may be designed in any sizes or shapes as long as the pair of the lenses 754 and 756 are conjugate, which means they operates optically just opposite.

FIG. 7E shows an example of a temple 760 that may be used in the display glasses described in the present invention. Whatever the material the temple 660 may use, it encapsulates an optical conduit 762 (e.g., the conduit 710 or 750) and an image source 764. As the optical conduit 762 is made of an array of optical fibers, it may be structured per a predefined shape and even curved if needed. In a summary, the conduit 762 is made part of the temple 760. The image source 764 is preferably positioned near one end of the end of the conduit 762, and may also be enclosed in the temple 760 according to one embodiment.

Regardless of how the image source 764 is structured, there has to be at least some wires that are used to couple the image source 764 to a portable device to receive image data, various signals and instructions. According to one embodiment, a microdisplay in the image source 712 or 752 requires power to operate and receives electronic signals to generate images/videos as expected. When the microdisplay is moved in or near a temple, the power and signals must be brought to the microdisplay. Various copper wires would have to be used. In a prior art system, a cable including one or more conductors or wires is commonly used. However, the weight of the cable is significantly heavier than a fiber cable and could add certain pressure on the glasses when the two temples are connected or attached to such a cable. In general, the more wires in a cable, the heavier a temple could be.

According to one embodiment, most of these wires are replaced by fibers. FIG. 8A shows what is called herein an active optical cable 800 that includes two ends 802 and 804 and at least one fiber 806 coupled between the two ends 802 and 804. In addition, there are at least two wires (not visible) in FIG. 8A embedded with the fiber 806, one for power and the other for ground. These two wires are essentially to supply the power from one end to another end. Depending on how or how many signals need to go through the cable 800, the number of the fibers 803 may vary or constant. The two ends 802 and 804 may be implemented as pluggable (e.g., USB-C type) depending on an actual need. Each of the two ends 802 and 804 includes a converter (e.g., a photodiode) to convert an electronic signal to a light or convert a light to an electronic signal. Each of the two ends 802 and 804 further includes necessary integrated circuits to perform encoding or decoding functions if needed, namely a data set or electronic signal when received is encoded and presented in a colored light or the colored light when received is decoded to recover the electronic signal. The details of the end 802 or 804 are not to be further provided herein to obscure other aspects of the present invention. It is assumed that the cable 800 is used to transport a set of signals from the end 802 to the end 804. When the end 802 receives the signals, the converter in the end 802 converts the signals to a light beam including a set of optical signals, where each of the optical signal is encoded per one of the signals. Alternatively, a set of beams is produced by the converter, each beam corresponds to one of the signals. A light beam is then transported within a fiber from the first end 802 to the second end 804. Once reaching the second end 804, a converter in the second end 804 converts the light beam back into one or more electronic signals. It can be appreciated by those skilled in the art that the cable 800 is much lighter than a wire-based cable that would be otherwise used to carry these signals. It can also be readily understood that the active optical cable needs one or more optical fibers to transmit data, control signals or various instructions needed to present appropriate images/videos to a viewer.

Figure 8B:
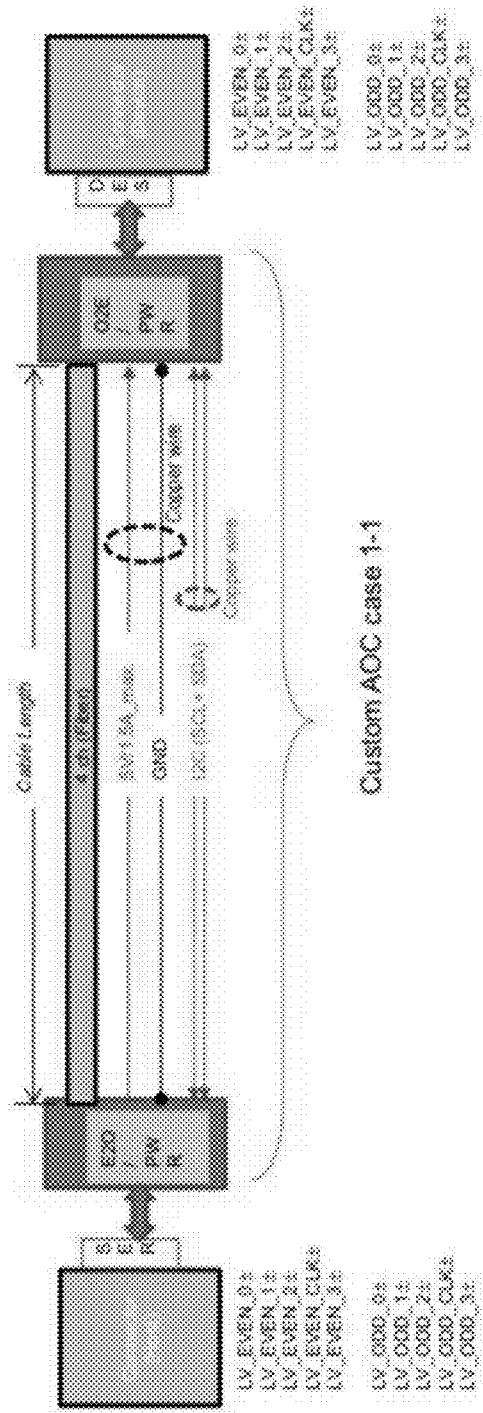
FIG. 8B and FIG. 8C each show an example of an active optical cable that includes four fibers for transporting four channel signals and three wires for the power and ground and a data bus.
Figure 8C:
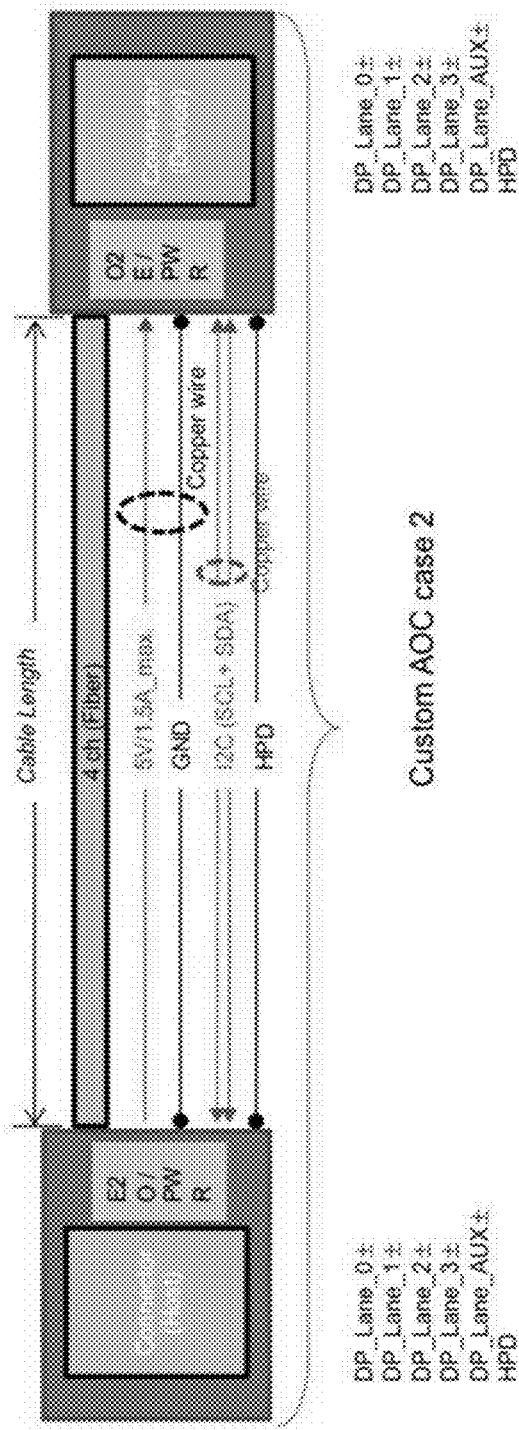

FIG. 8A lists specifications such a cable 808 may be implemented based upon. The number of fibers may be individually specified depending on the implementation. In one example, image data in red, green and blue is respectively transported in three different fibers while the control signals are transported in one fiber, thus making a 4-channel fibers configuration for the active optical cable. FIG. 8A also shows the flexibility of such a fiber-based cable that may be folded or extended without loss of the signals. FIG. 8B and FIG. 8C each show an example of the cable 800 that includes 4 fibers for transporting image data and control signals and three wires for the power, ground and a I2C data bus, but with different interfaces (LVDS vs. DisplayPort). As the power consumption is small in this type of application, the wire for the power or the ground can be made very thin to reduce the weight of the cable 800.

Figure 9A:
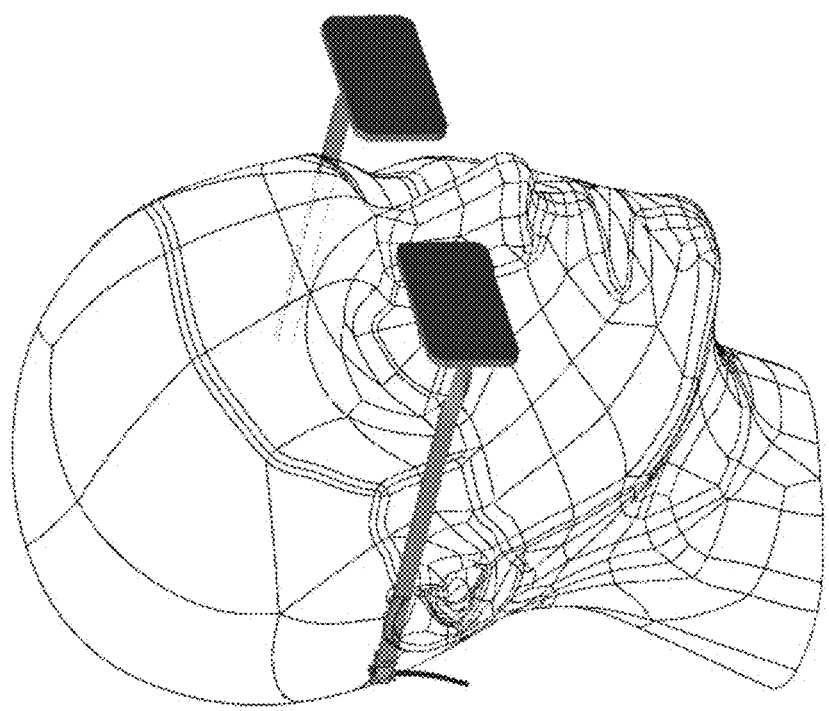
FIG. 9A shows a skeleton of a pair of glasses worn on a human being.
Figure 9B:
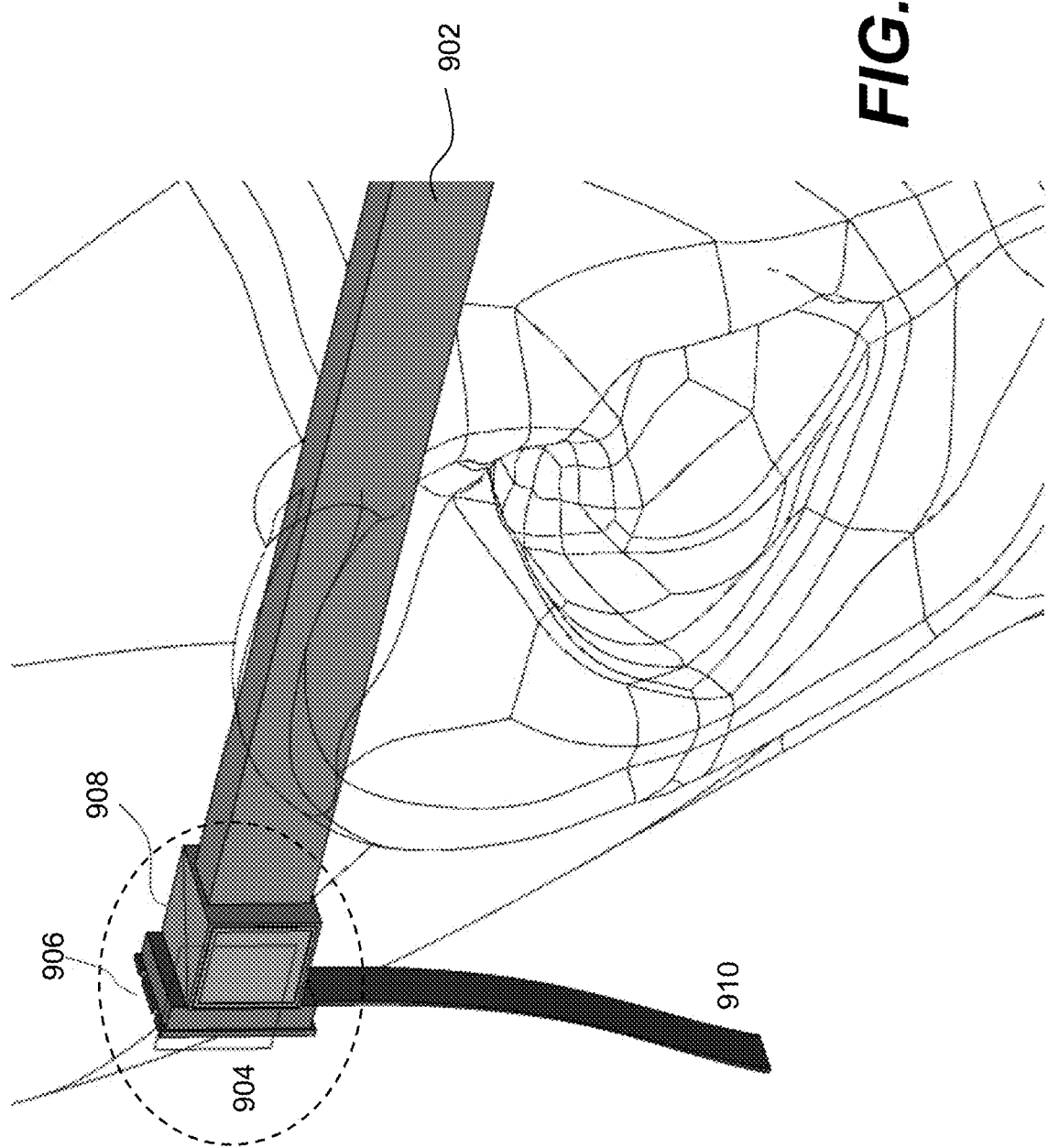
FIG. 9B shown an exploded view near the end of a temple of the glasses.

Referring now to FIG. 9A, it shows a skeleton of a pair of glasses 900 worn on a human being. FIG. 9B shown an exploded view near the end of a temple of the glasses 900. The temple includes an optical conduit 902. One end of the conduit 902 is coupled to an optical image source 904 to receive an optical image therefrom. The source 904 includes a microdisplay 906 and an optical cube 908. With an active optical cable 910, the optical image source 904 receives control signals as well as image or video data to produce the optical images or videos. The optical signals are projected into and transported via the conduit 902 to another end thereof.

Figure 9C:
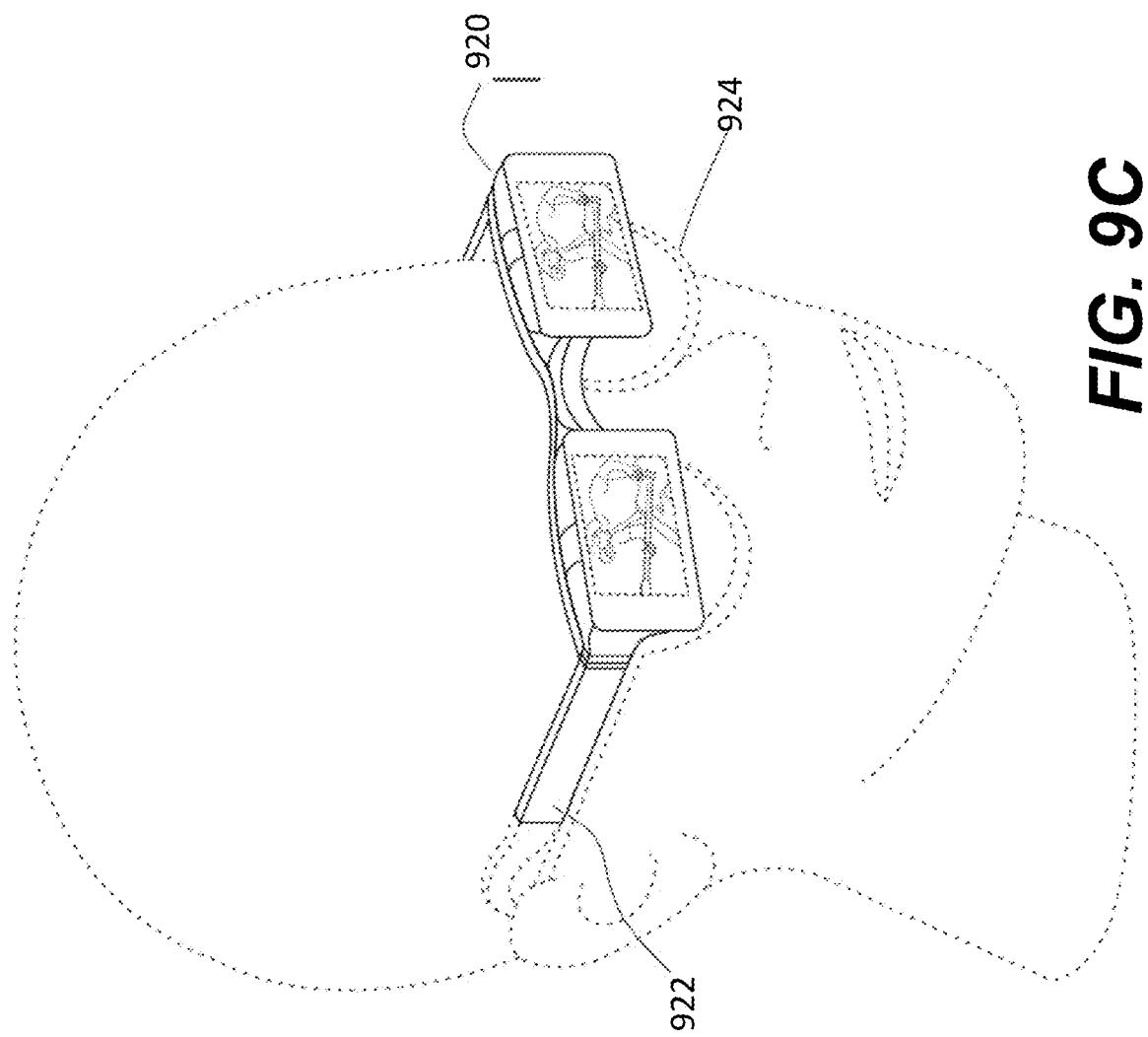
FIG. 9C shows another embodiment in which the display glasses are implemented as a set of clipped-on glasses on a regular reading glasses.

FIG. 9C shows another embodiment in which the display glasses are implemented as a set of clipped-on glasses 920 on a regular glasses. Slightly different from the regular clipped-on sun glasses, the glasses 920 include at least one temple 922, where the temple 922 encapsulates one optical conduit to transmit an optical image from one end to another. It should be noted that the temple 922 is truncated. It is not necessarily extended all the way to an ear of a human being or wearer. Depending on the implementation, the length of the truncated temple 922 may be around one inch or extended to the ear. One of the purposes to have such a truncated temple 922 is to distribute the weight of the clipped-on glasses 920 or pressure away from the nose largely responsible for holding the glasses 924 as well as the clipped-on glasses 920. An active optical cable (not shown) is provided to couple the truncated temple 922 to a portable device (not shown).

Figure 9D:
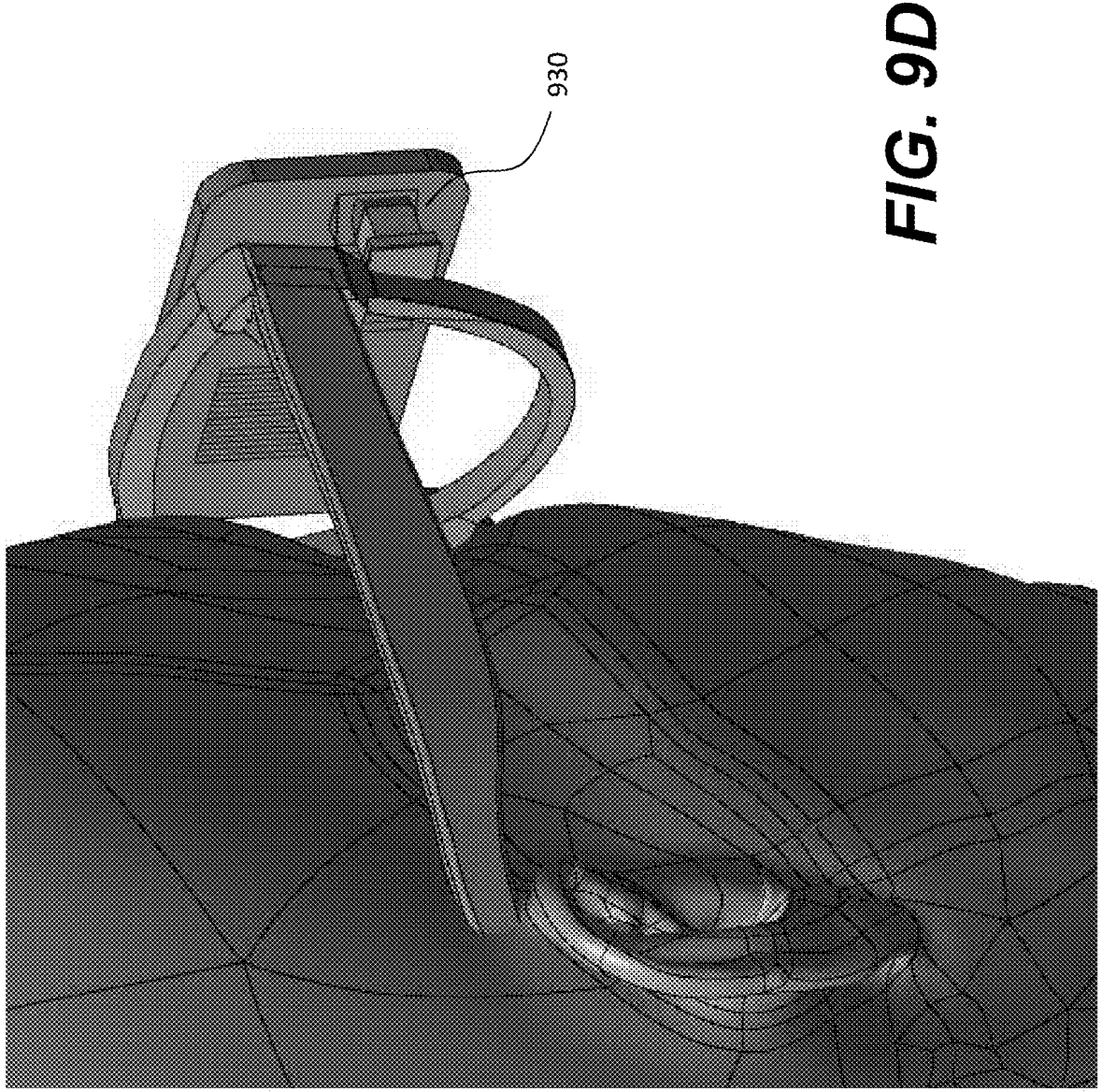
FIG. 9D shows an embodiment in which an optical conduit is not directly used in a temple.
Figure 9E:
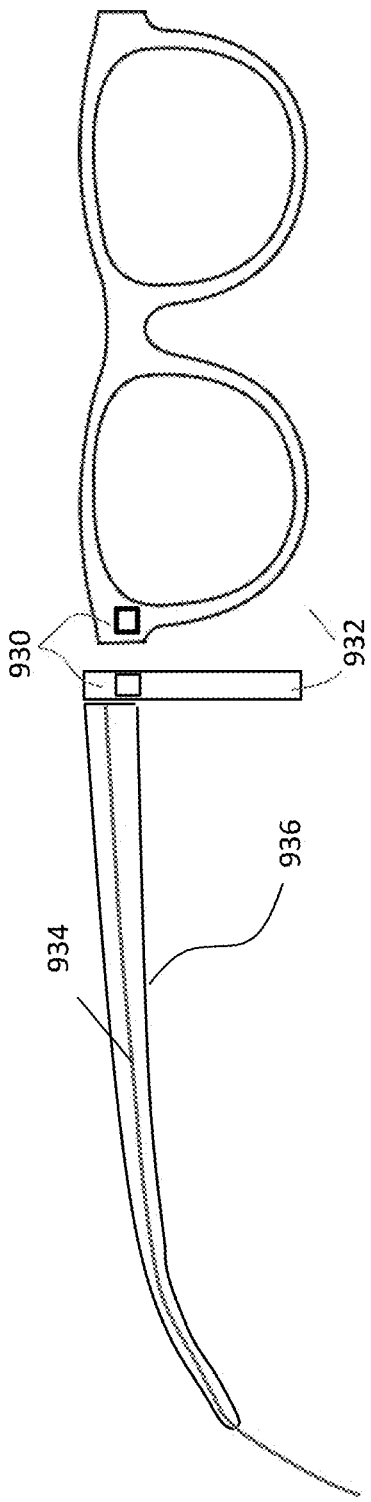
FIG. 9E illustrates one embodiment in which an optical block is integrated in a glasses frame or a lens frame, where the optical block includes a cube, microdisplay and a light source.
Figure 9F:
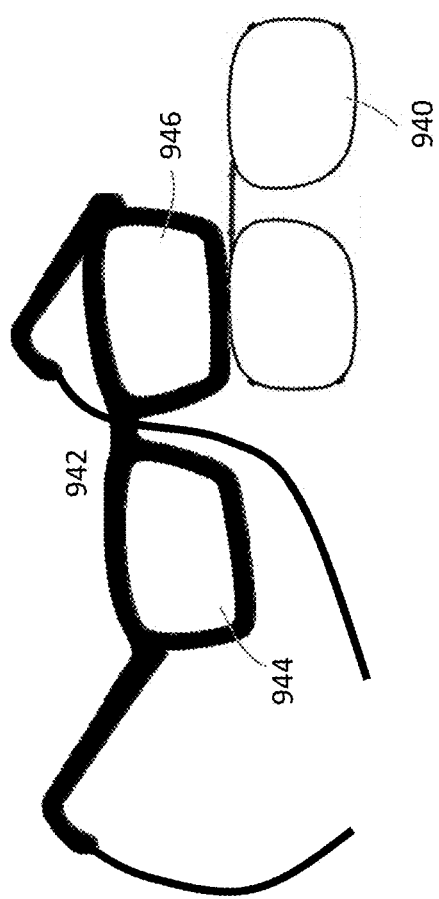
FIG. 9F shows a mask or a clip-on cover to be used when the display glasses are used for VR applications.

As an option or comparison, FIG. 9D shows an embodiment in which an optical conduit is not directly used in a temple. Instead, an image source 930 is provided near a piece of integrated lens (e.g., 260 of FIG. 2F). The image source 930 is implemented as a block or an optical block as it includes an optical cube. The block 930 is shown to be positioned near the display lens (e.g., the integrated lens 260 of FIG. 2F). FIG. 9E illustrates one embodiment in which the block 930 is integrated in a glasses frame or a lens frame 932. Instead of using an optical conduit, an active optical cable 934 is used to deliver a data image all the way near the integrated lens (not shown), where the block 930 including a microdisplay device and a light source generates an optical image per the data image. The active optical cable 934 is embedded in or integrated with the temple 936. The optical image is then projected into the integrated lens as shown in FIG. 2F. As an option, FIG. 9F shows an embodiment in which a display device can be covered with a mask. In some applications (e.g., VR or viewing a length video), the see-through feature of the display glasses may impose some disruptions when the ambient light or movement are relatively strong. Thus a mask 940 is provided and may be mounted onto the display glasses 942. In particular, the mask 940 is intended to disable the see-through feature of the display glasses 942, so the viewer may concentrate the viewing of the video being displayed in the lenses 944 and 946. According to one embodiment, the mask 940 is made opaque to block the lights (e.g., ambient lights) from the surrounding. For convenience, the mask 940 may be made in the form of sunglasses clip-on for easy on or off. In one embodiment, the mask 940 may also be made as a goggle to block nearly all of the ambient lighting from the surrounding.

Figure 10A:
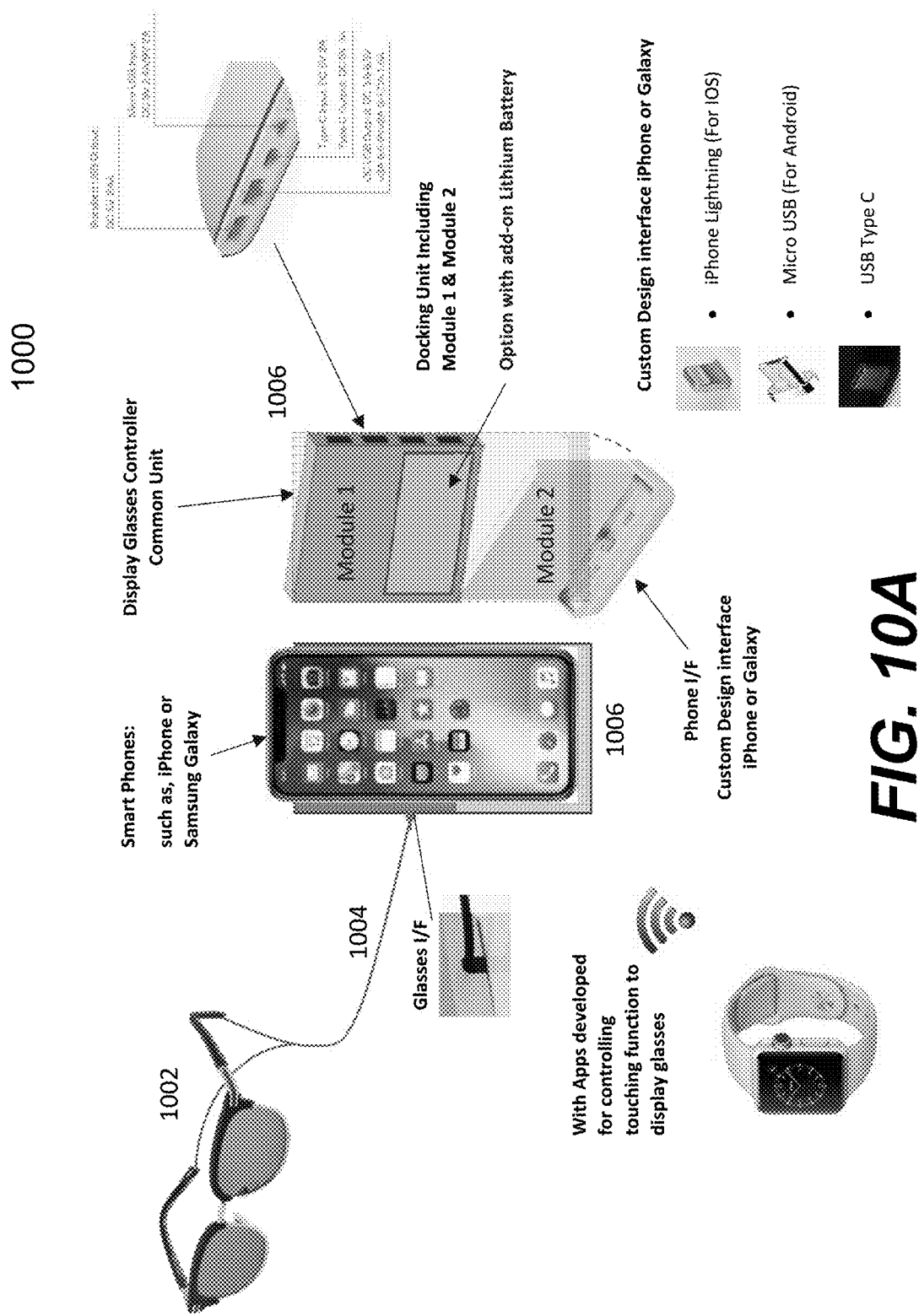
FIG. 10A shows a block diagram of using a pair of display glasses (i.e., display device) with a smartphone (e.g., iPhone) according to one embodiment of the present invention.

Referring now to FIG. 10A, it shows a block diagram 1000 of using a pair of display glasses (i.e., display device) 1002 with a smartphone (e.g., iPhone), according to one embodiment of the present invention. The glasses 200 of FIG. 2A or the glasses 900 of FIG. 9A may be used as the display device 1002. A cable 1004 (e.g., the active optical cable 800 of FIG. 8A) is used to couple the glasses 1002 to a docking unit 1006, the docking unit 1006 is provided to receive a smartphone. The docking unit 1006 allows a user (i.e., a wearer of the display device 1002) to control the display device 1002, for example, to select a media for display, to interact with a display, to activate or deactivate an application (e.g., email, browser and mobile payment).

According to one embodiment, the docking unit 1006 includes a set of batteries that may be charged via a power cord and used to charge the smartphone when there is a need. One of the advantages, benefits and objectives in the embodiment of providing a docking unit is to use many functions already in the smartphone. For example, there is no need to implement a network interface in the docking unit because the smartphone has the interface already. In operation, a user can control the smartphone to obtain what is intended for, the content of which can be readily displayed or reproduced on the display device via the cable 1004 coupling the docking unit 1006 to the display device 1002.

As shown in FIG. 10A, the docking unit 1006 includes two parts, either one or both may be used in one implementation. The first part includes a receiving unit to receive a smartphone and may or may not have a battery pack that can be recharged and charge the smartphone when there is one and the smartphone is received. The second part includes various interfaces to communicate with the smartphone to receive data and instructions therefrom for the display device 1002 to display images/videos for the wearer to view. One of the important features, benefits and advantages in the present invention is the use of an active optical cable to couple the portable device to the display device 1002. In general, the portable device is worn by the wearer (e.g., attached to a belt or pocket). In one embodiment, the clothing 270 of FIG. 2I may be used to conceal the cable and provide more freedom for the wearer to move around.

Figure 10B:
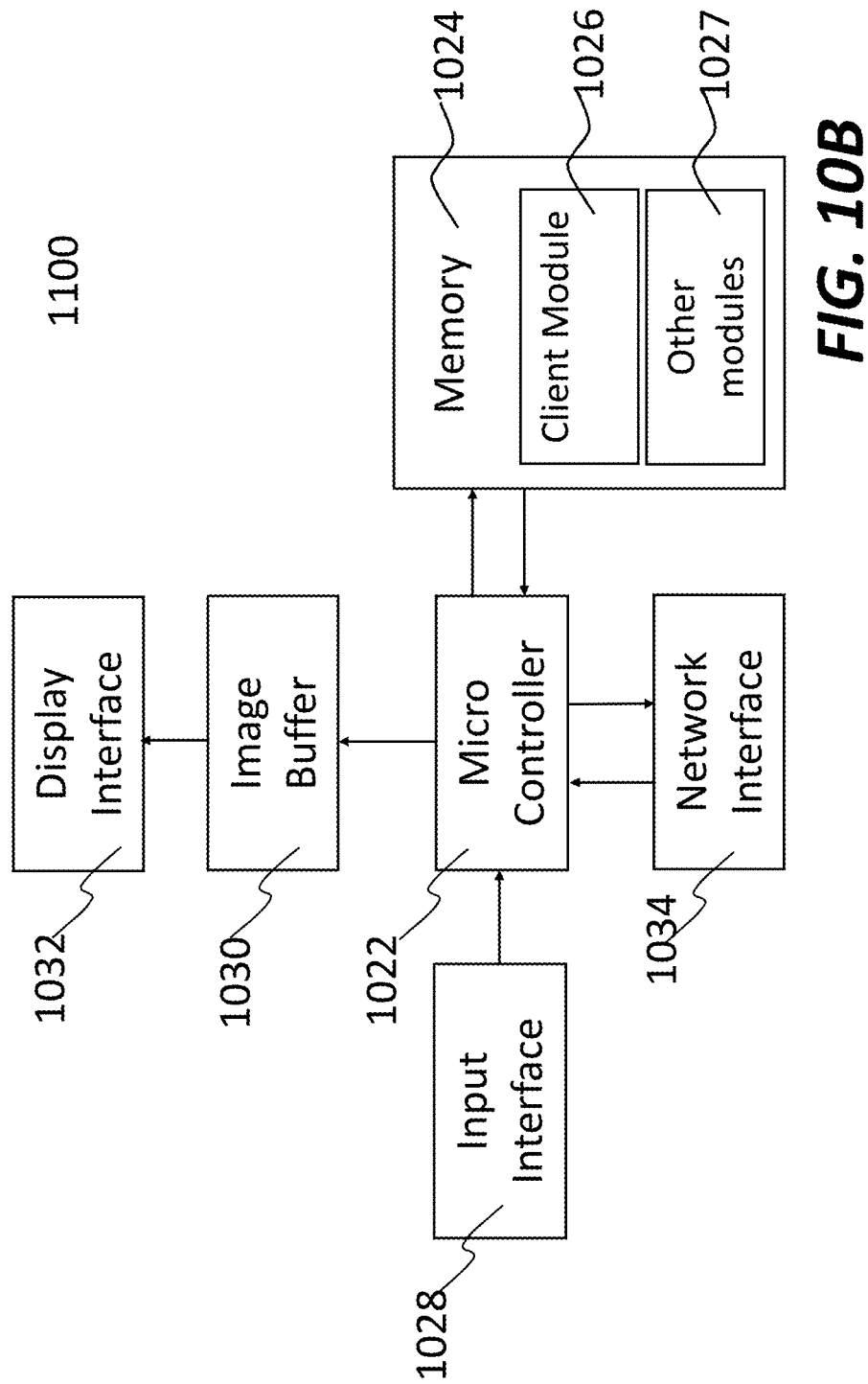
FIG. 10B illustrates an internal functional block diagram of an exemplary docking unit that may be used in FIG. 10A or as an independent portable device that may be operated by a wearer to control the display device.

Referring now to FIG. 10B, it illustrates an internal functional block diagram 1100 of an exemplary docking unit that may be used in FIG. 10A or as an independent portable device that may be operated by a wearer to control the display device 1002. The device, as shown in FIG. 10B, includes a microprocessor or microcontroller 1022, a memory space 1024 in which there is an application module 1026, an input interface 1028, an image buffer 1030 to drive a display device via a display interface 1032 and a network interface 1034. The application module 1026 is a software version representing one embodiment of the present invention, and downloadable over a network from a library (e.g., Apple Store) or a designated server. One exemplary function provided by the application module 1026 is to allow a user (or a wearer of the display device) to enable certain interactions with a display by predefined movements of an eye being sensed by the sensor 266 of FIG. 2F.

The input interface 1028 includes one or more input mechanisms. A user may use an input mechanism to interact with the display device by entering a command to the microcontroller 1022. Examples of the input mechanisms include a microphone or mic to receive an audio command and a keyboard (e.g., a displayed soft keyboard) or a touch screen to receive a command. Another example of an input mechanism is a camera provided to capture a photo or video, where the data for the photo or video is stored in the device for immediate or subsequent use with the application module 1026. The image buffer 1030, coupled to the microcontroller 1022, is provided to buffer image/video data used to generate the optical image/videos for display on the display device. The display interface 1032 is provided to drive the active optical cable and feeds the data from the image buffer 1030 thereto. In one embodiment, the display interface 1032 is caused to encode certain instructions received on the input interface 1028 and send them along the active optical cable. The network interface 1034 is provided to allow the device 1100 to communicate with other devices via a designated medium (e.g., a data network). It can be appreciated by those skilled in the art that certain functions or blocks shown in FIG. 10B are readily provided in a smartphone and are not needed to be implemented when such a smartphone is used in a docking unit.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. A display apparatus comprising:
   at least an integrated lens including an optical lens and a waveguide integrated with the optical lens, the waveguide being optically transparent and see-through;
   an image source providing an optical image, wherein the optical image is a two-dimensional array of light intensities and produced optically via one or more optical lenses from a displayed image;
   an optical conduit including a bunch of optical fibers; and
   two temples, at least one of the temples integrating with the optical conduit, wherein the optical conduit is coupled to the image source located near one end of the optical conduit, wherein the optical conduit is rotated by a predefined degree to cause the optical image to be rotated by the predefined degree and transmit the optical image from the image source to another end of the optical conduit by total internal reflections within the optical conduit, wherein the optical image coming out from the optical conduit is optically projected into the waveguide and travels from one end to another end of the waveguide for display therein.

2. The display apparatus as recited in claim 1, wherein the predefined degree is between 0 degree and 90 degrees.

3. The display apparatus as recited in claim 2, wherein the optical image is rotated from the image source and rotated back after the optical image has gone through the optical conduit.

4. The display apparatus as recited in claim 1, wherein an aspect ratio of the optical image is reversed when the optical image is provided from the image source.

5. The display apparatus as recited in claim 4, wherein the optical conduit is rotated by 90 degrees, and the aspect ratio of the optical image is normalized after the optical image has gone through the optical conduit.

6. The display apparatus as recited in claim 1, further comprising:
an optically shrinking lens positioned between the image source and the optical conduit and shrinking the optical image from the image source before the optical image is projected into the optical conduit, wherein the shrunk image goes through the optical conduit; and
an optically expanding lens positioned beyond the another end of the optical conduit to expand the shrunk image back to the optical image after the shrunk optical image is coming out from the optical conduit.

7. The display apparatus as recited in claim 6, wherein the optically shrinking lens and the optically expanding lens perform optically and equally opposite.

8. The display apparatus as recited in claim 1, wherein the image source comprises:
an optical cube including two triangular halves integrated with a film therebetween;
a light source; and
a microdisplay device to produce the optical image, wherein both of the light source and the microdisplay device are mounted on two different surfaces of the optical cube.

9. The display apparatus as recited in claim 1, further comprising at least an active optical cable coupling an electronic image to the image source for providing the optical image, the active optical cable supplies power to the image source for producing the optical image, transmission of the optical image from the image source to the waveguide via the optical conduit and subsequently to a view point in the waveguide for viewing by a wearer requires no power from the active optical cable.

10. A display apparatus comprising:
at least an integrated lens including an optical lens and a waveguide, the waveguide integrated with the optical lens, the waveguide being optically transparent and see-through;
a temple;
an optical block receiving an optical image from a micro display device, wherein the optical image is a two-dimensional array of light intensities and produced optically via one or more optical lenses from a displayed image;
at least an optical conduit with a first end and a second end, the optical conduit integrated within the temple, the first end coupled to the optical block and receiving the optical image, wherein the optical conduit is rotated by a predefined degree to cause the optical image to be rotated by the predefined degree and the optical image is transported to the second end of the optical conduit by total internal reflections within the optical conduit; and
wherein the integrated lens, coupled to the second end, receives the optical image from the optical conduit and transmits the optical image along the waveguide to a point of view for a user of the display device to view the optical image.

11. The display apparatus as recited in claim 10, further comprising:
an active optical cable including at least one optical fiber and two wires, wherein the optical fiber is used to transmit at least a control signal to control the micro display device, and the two wires, one for power and the other for ground, are used to energize the micro display device.

12. The display apparatus as recited in claim 10, wherein the optical conduit includes a plurality of optical fibers integrated to form a single piece with a predefined shape for being used as part of the temple or encapsulated in the temple.

13. The display apparatus as recited in claim 12, further comprising: a light source shining on the micro display device to produce the light intensities forming the optical image.

14. The display apparatus as recited in claim 10, wherein the predefined degree is between 0 degree and 90 degrees.

15. The display apparatus as recited in claim 14, wherein the optical image received has an aspect ratio of V:H, the predefined degree is 90 degrees, and the optical image coming out from the second end has an aspect ratio of H:V.

16. The display apparatus as recited in claim 10, further comprising:
a first lens positioned between the optical block and the optical conduit, wherein the optical image is optically shrunk before being transported through the optical conduit; and
a second lens positioned near the second end of the conduit, wherein the distorted optical image coming out from the conduit is expanded by the second lens, the first and second lenses are conjugate optically.

17. The display apparatus as recited in claim 10, wherein the optical conduit is encapsulated in a type of material to form part of the temple.

18. The display apparatus as recited in claim 10, further comprising:
at least an active optical cable coupling the micro display device to an external portable device and receiving an electronic image therefrom an including a first end and a second end, at least one optical fiber and two wires coupling the first end with the second end, wherein electronic signals are converted to optical signals travelling in the optical fiber, the optical signals are converted back to the electronic signals when coming out from the optical fiber.

19. The display apparatus as recited in claim 18, wherein the waveguide and the optical lens are stacked so that the user sees through the integrated lenses.

* * * * *